Sept. 6, 1932.      R. HOFGAARD      1,876,293
ELECTRIC CALCULATING MACHINE
Filed Sept. 22, 1927      9 Sheets-Sheet 9
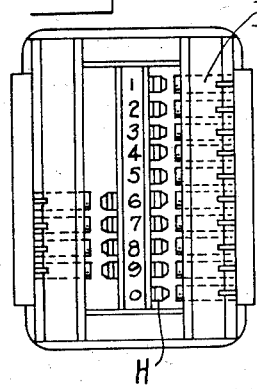
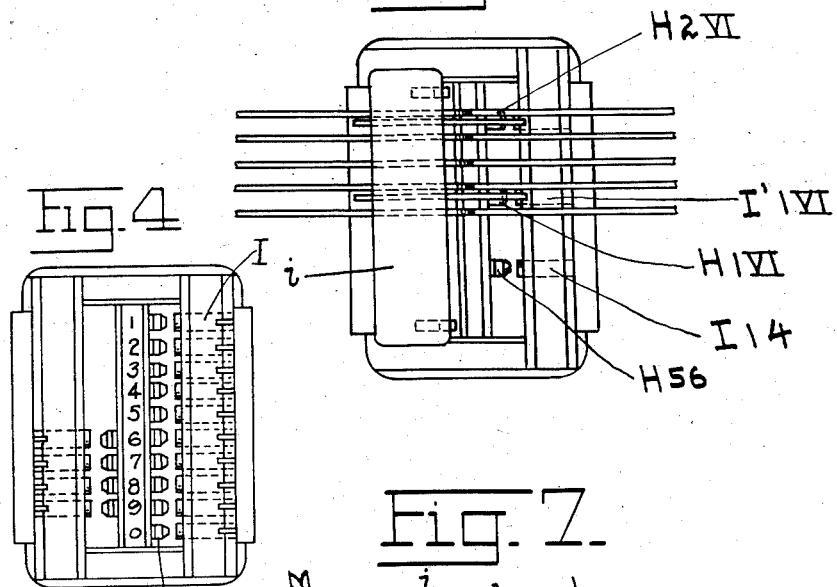
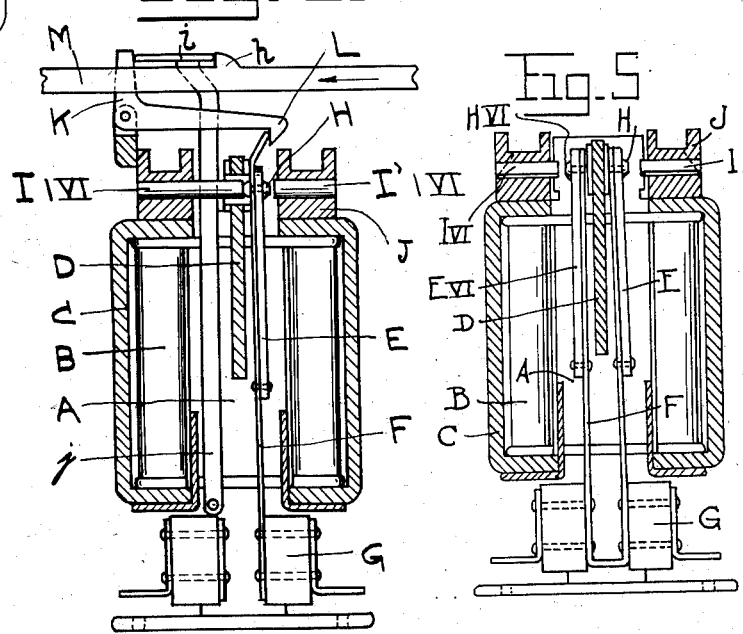
Inventor:
Rolf Hofgaard, Patented Sept. 6, 1932

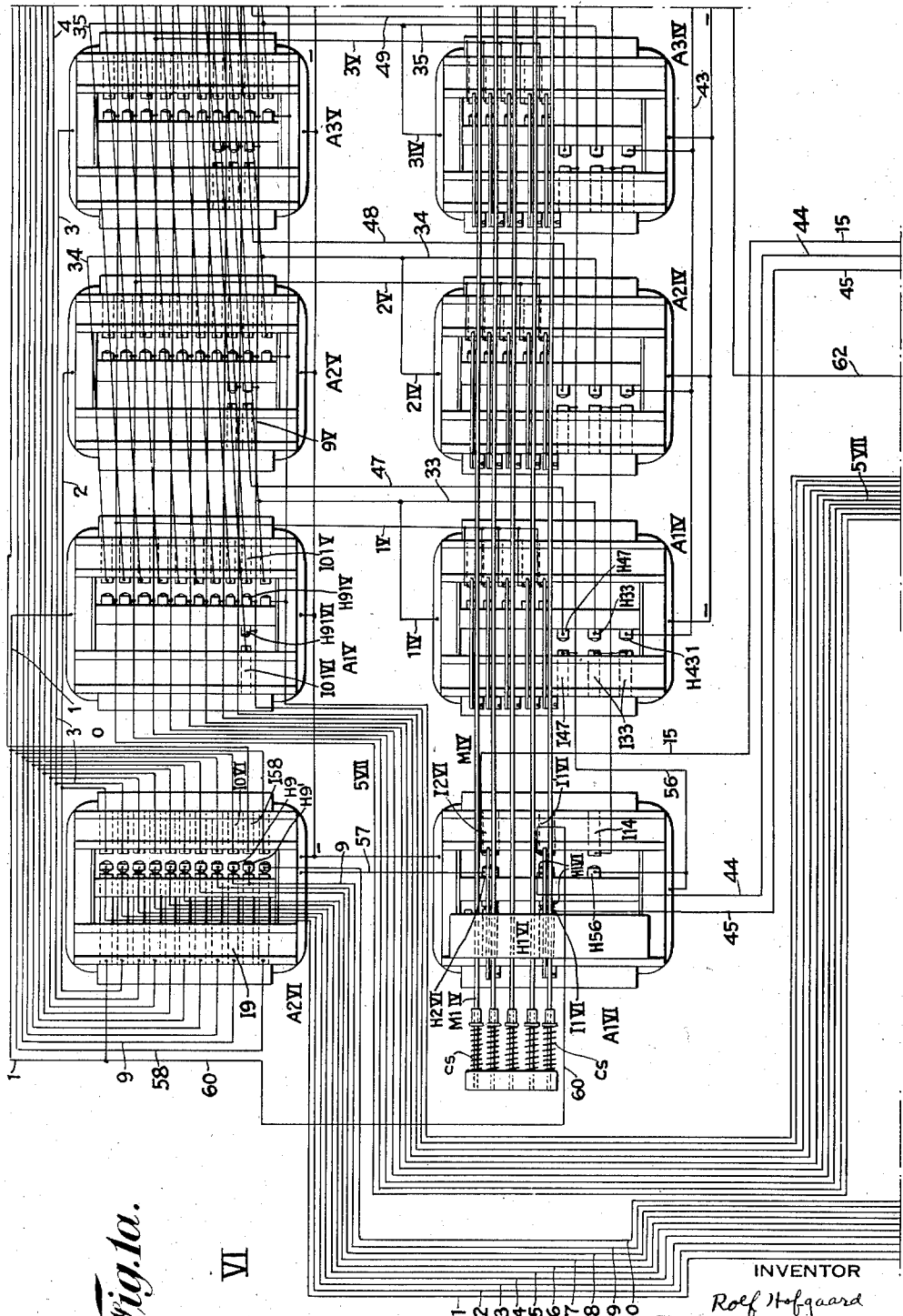

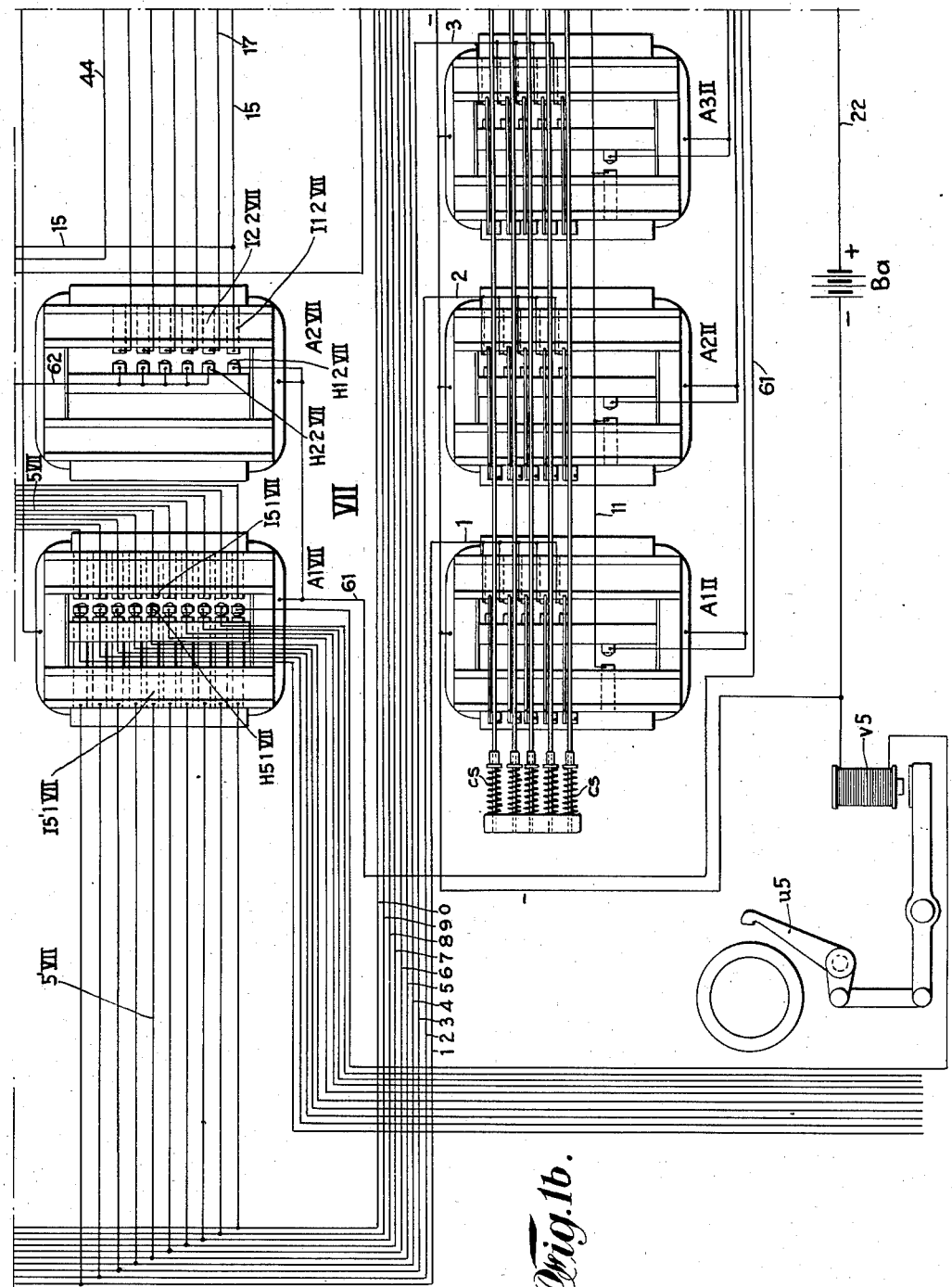

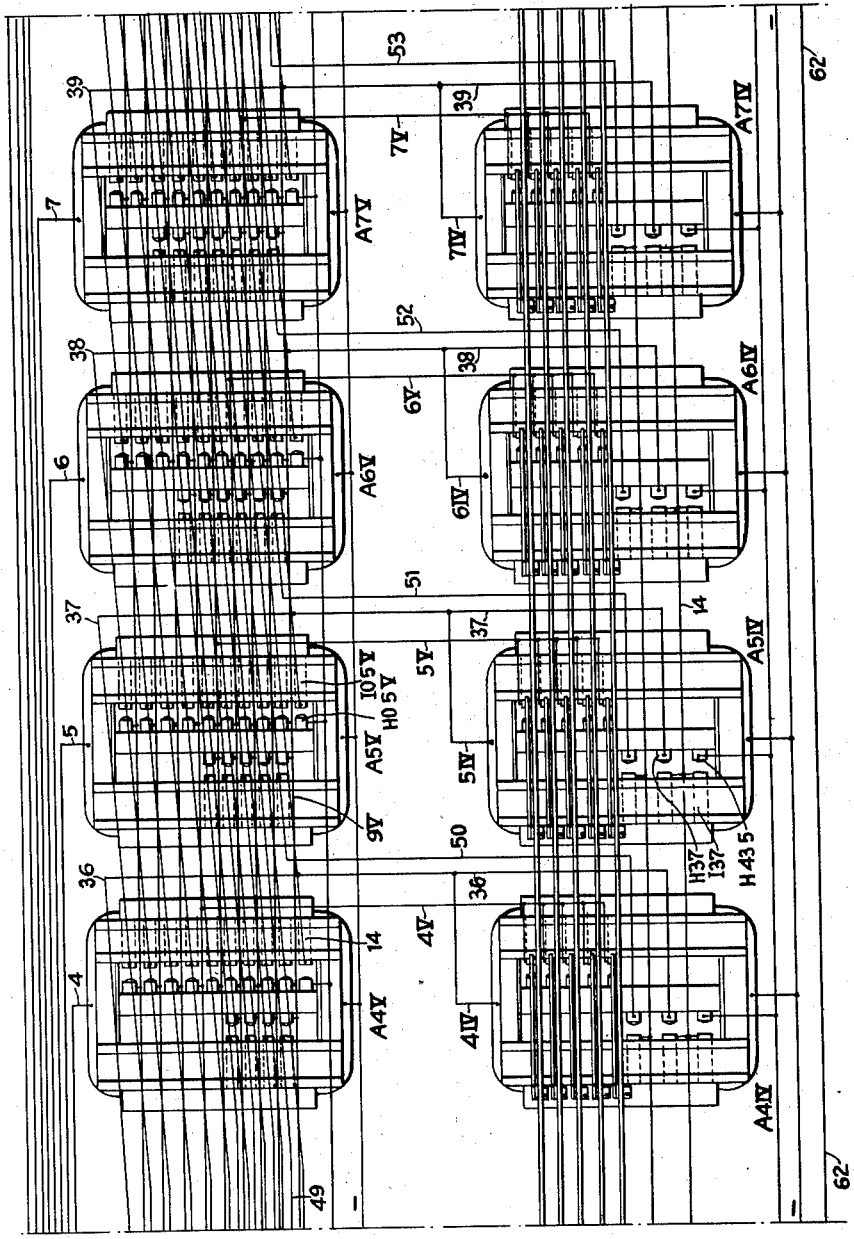

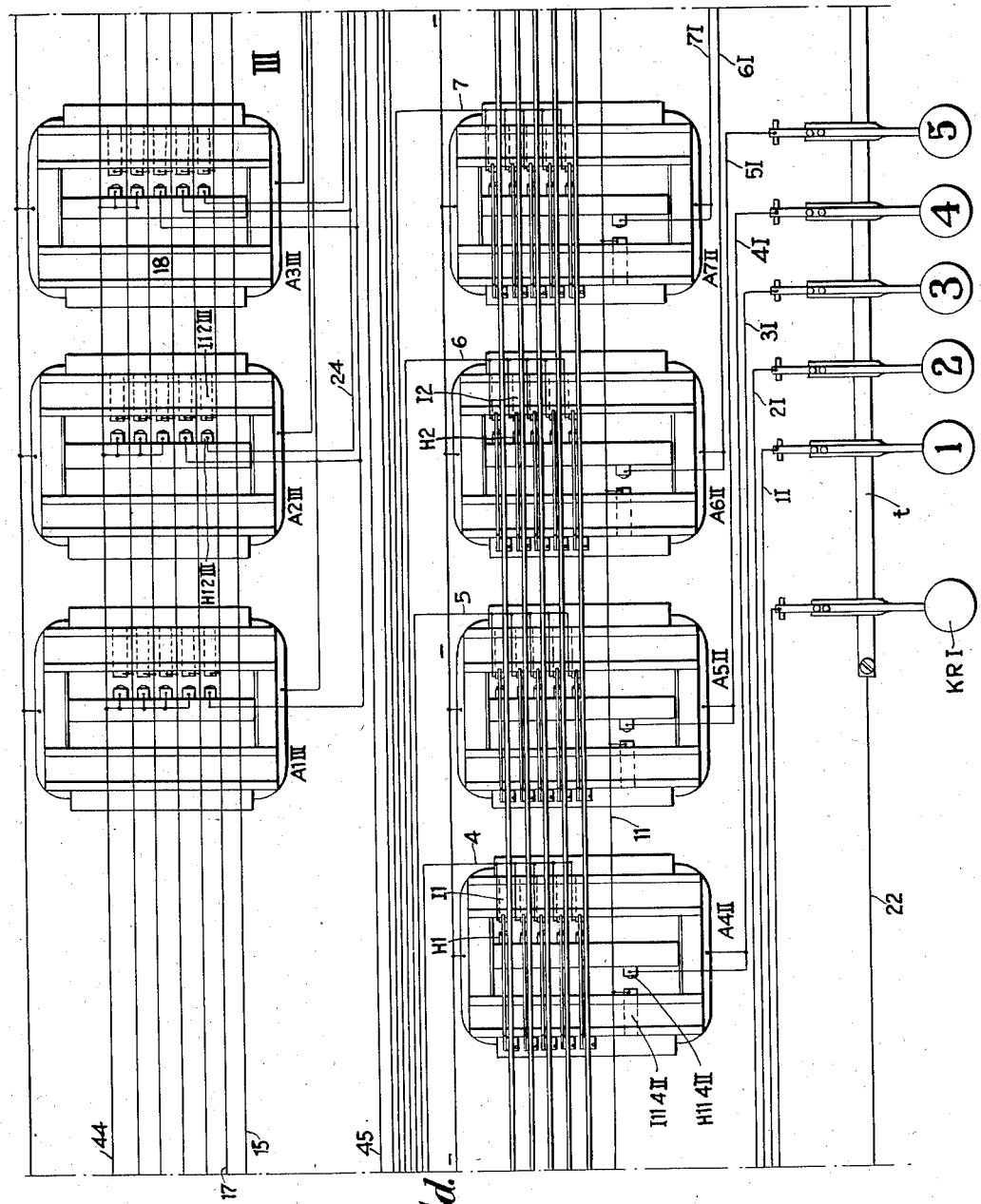

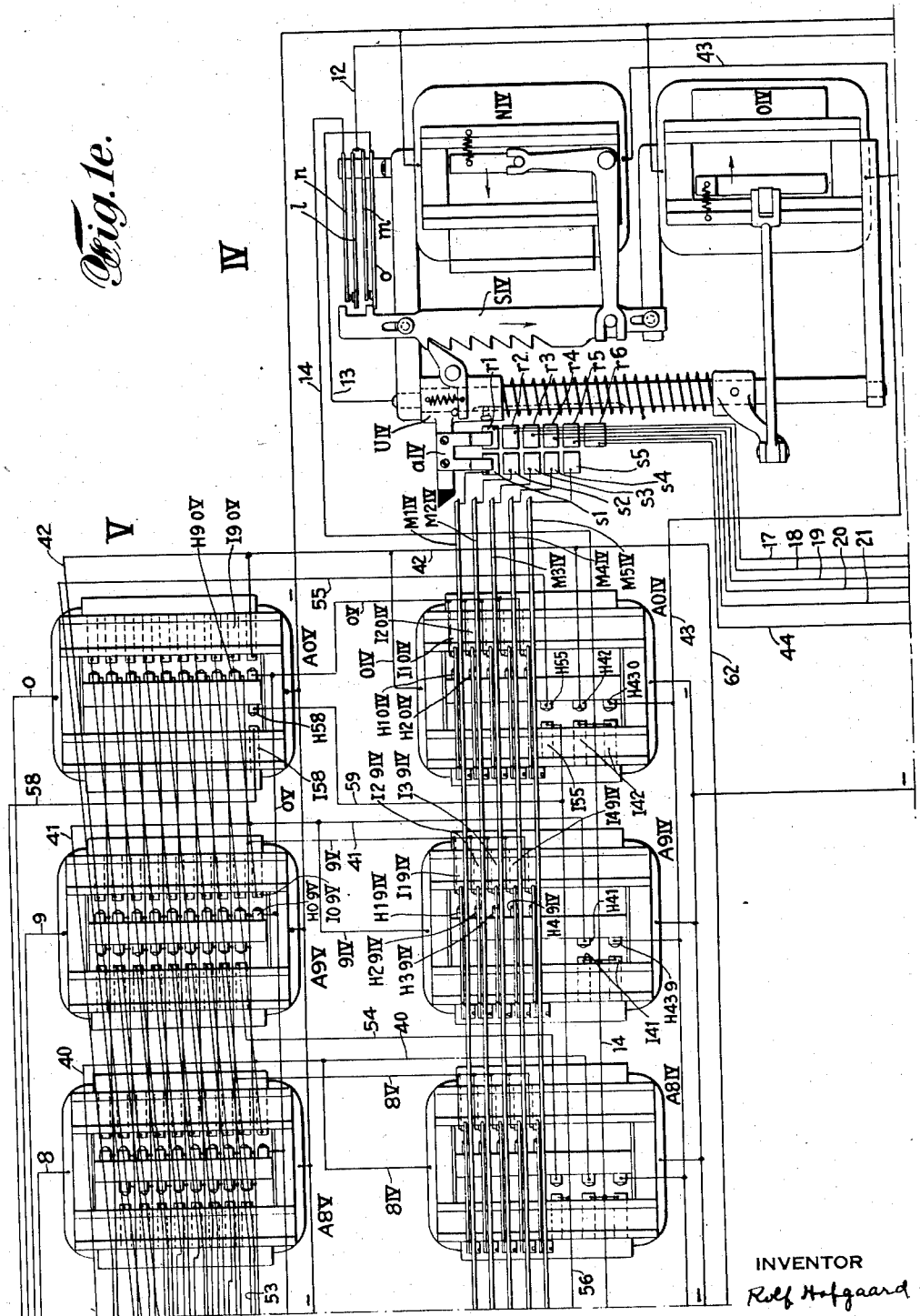

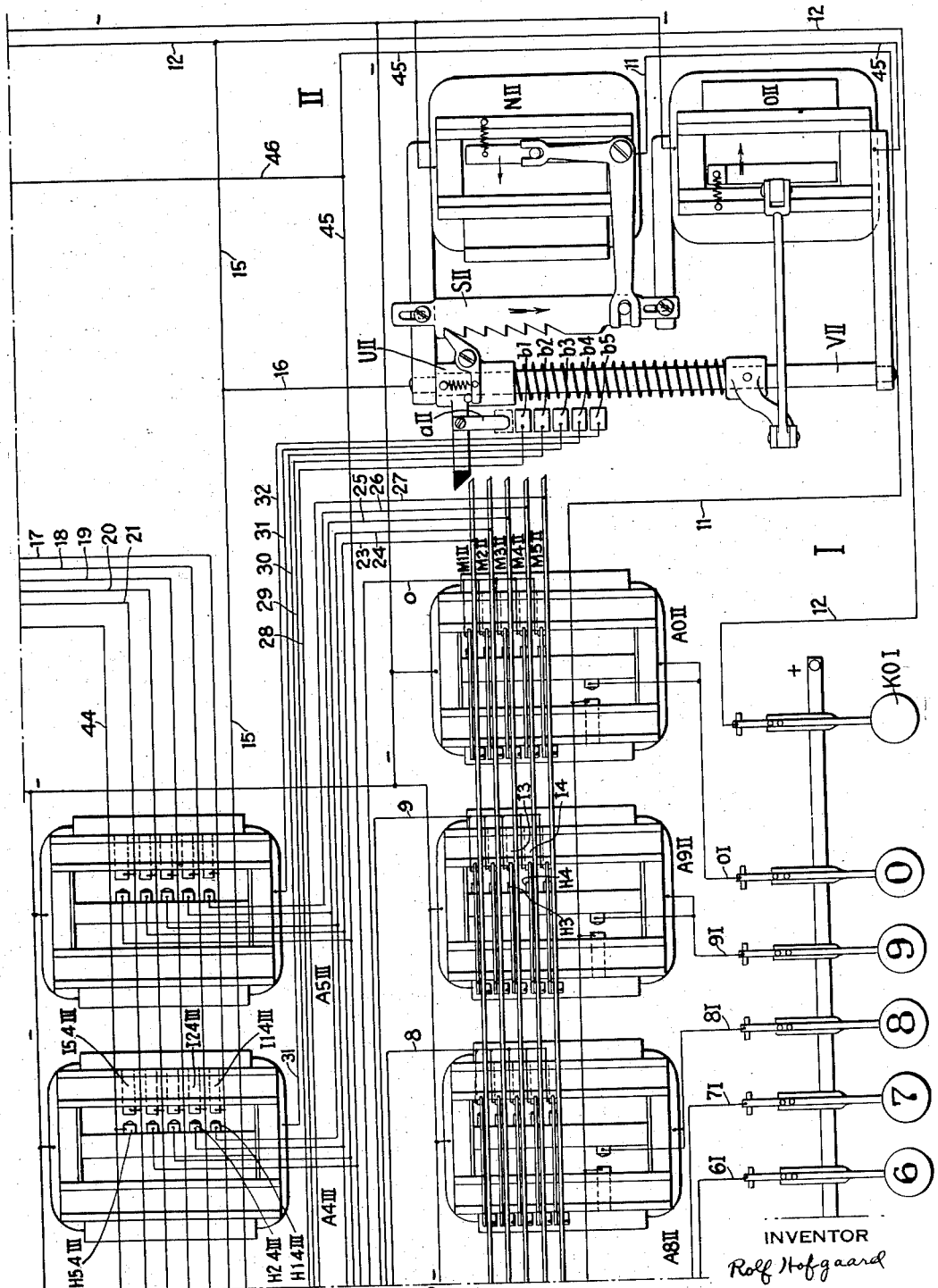

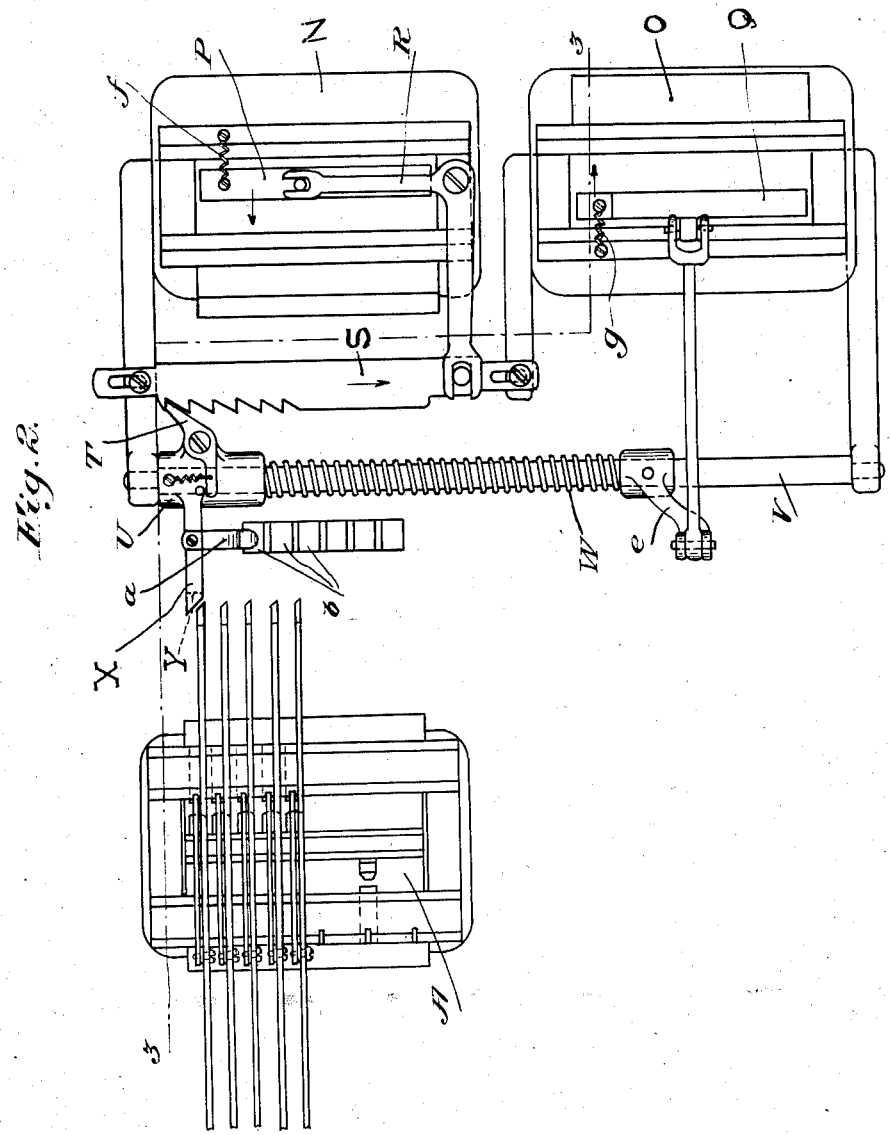

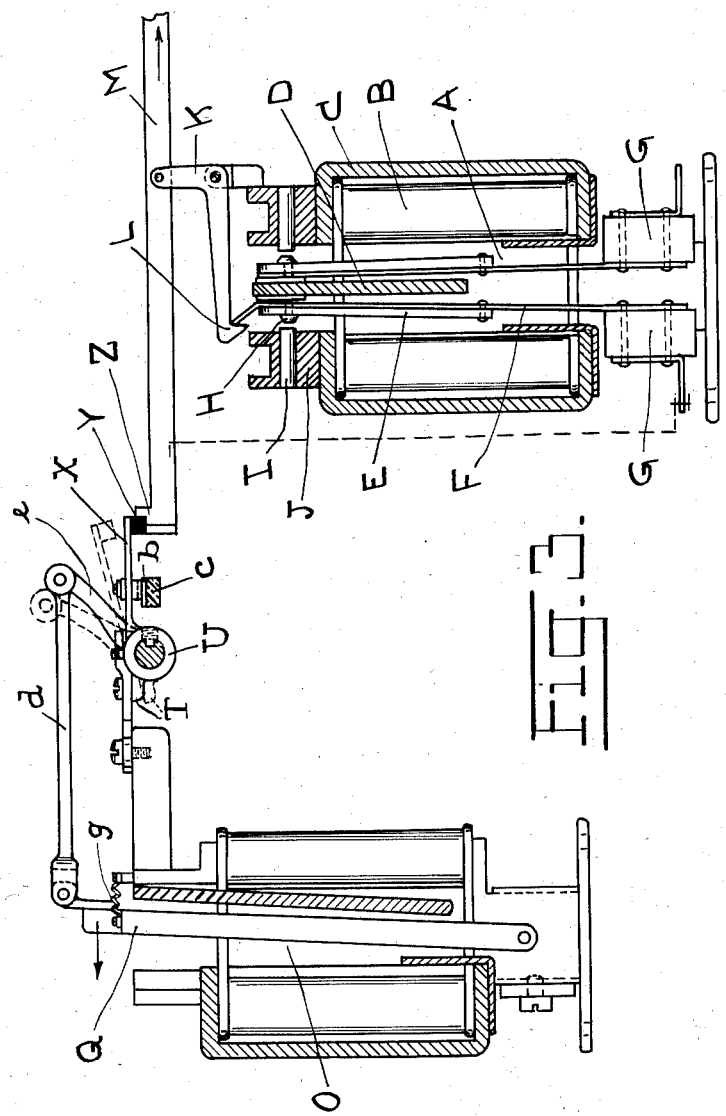

1,876,293

UNITED STATES PATENT OFFICE

ROLF HOFGAARD, OF OSLO, NORWAY, ASSIGNOR, BY MESNE ASSIGNMENTS, TO HOF-GAARD-REMINGTON CORPORATION, OF NEW YORK, N. Y., A CORPORATION OF DELAWARE

ELECTRIC CALCULATING MACHINE

Application filed September 22, 1927. Serial No. 221,330.

The present invention has for its object an electric calculating machine which is based on the principle of operation described and claimed in U. S. application No. 688,564.

According to the principle of operation described and claimed in the aforementioned application, the electric calculating machine comprises two sets of 10 digit lines, said digit lines being adapted to be interconnected in 10 different combinations by the operation of keys corresponding to the various numbers entering into the calculation.

The machine also comprises registering elements, each of which is adapted to be operated by a current passing through a line in one of the aforementioned sets of digit lines.

The said registering elements again control contact members for closing said lines in the other set of digit lines.

In a calculating machine of this kind, the effect of depressing a certain key on the key board will depend on the key of the same denominational value previously depressed, the result registered being equal to any function of the digits corresponding to the said keys for which the particular machine is constructed.

Thus, in an adding machine for single numbers, if key No. 3 has been depressed, the depression of key No. 4 owing to the combination in which the two sets of 10 digit lines have been connected by the key No. 3 will actuate the registering number for No. 7 etc.

In the calculating machine according to this principle which was described in the aforementioned application No. 688,564, the means for successively registering the effects of depressions of the keys consist in a ribbon which is caused to be perforated by means of electrically operated perforating members, said perforations acting to control the contacts for closing the corresponding digit line circuits upon the depression of the next key.

The principal improvement according to the present invention consists in substituting for the ribbon specified in the earlier patent specification a set of multiple contact relays, each of which is adapted to be energized by means of current in one line of one of the sets of digit lines, and which cooperates with electrically operated means for locking the contacts closed and again releasing the same and locking them in open position, when a different digit of the same denominational value is entered.

Another improvement in accordance with the present invention consists in means for automatically reversing the order of the digits entered into the machine by means of the key-board, in a machine for multi-digit numbers.

The object of this improvement is to enable numbers to be entered into the machine, starting with the digit of the largest denominational value, causing—however—the digit of the smallest denominational value to operate first etc., whereby the process of tabulating is greatly simplified.

These and other improvements will be better understood from the following specification, describing an embodiment of the invention with reference to the drawings, where:

Figs. 1a, 1b, 1c, 1d, 1e and 1f together constitute a diagram of a complete adding machine, showing the several relays laid out in one plan as well as the electrical connections between the same.

Fig. 2 is a plan view on a larger scale of a multiple contact relay and the locking and ratchet mechanisms cooperating therewith.

Fig. 3 is a vertical cross section of the multiple contact relay, locking device and ratchet mechanism taken substantially on the line 3—3 of Fig. 2.

Fig. 4 is a plan view on a larger scale of one of the 10 multiple contact relays adapted to connect the two sets of 10 digit lines in 10 combinations.

Fig. 5 is a vertical cross section of the relay according to Fig. 4.

Fig. 6 is a plan view on a larger scale of one of the transfer relays and

Fig. 7 is a cross sectional view thereof.

The machine as illustrated comprises several sections each having their separate function.

The sections of the machine as seen on the diagrammatical plan, Figs. 1a to 1f, may be numbered as follows:

I. Key board:—

The key board comprises 10 keys, numbered 1, 2, 3, 4, 5, 6, 7, 8, 9, 0, each adapted to connect a line to a contact bar directly connected to the plus lead of the battery. Further, the key board comprises an operating key K. O. I and a result key K. R. I, the operation and function of which will be described later on.

II. Primary register:—

The primary register comprises 10 multiple contact relays, the detailed construction of which will be apparent from Figs. 2 and 3. The primary register also comprises a magnetically operated ratchet mechanism for locking and releasing the several contacts of the multiple relays. The detailed construction of the ratchet mechanism will be apparent from Figs. 2 and 3. The object of the primary register is to close contacts corresponding to the numeral keys depressed on the key board and to lock said contacts in closed position. The detailed operation and function of the primary register will be further described with reference to the drawings.

III. Reversing device:—

The reversing device comprises a number of multiple contact relays corresponding to the largest number of digits with which the machine is adapted to operate.

The object of the reversing device is to automatically associate the contact closed in the last row of contacts acted upon in the primary register with means to actuate a contact in the first row of contacts in the secondary register, so that when for instance a number of four figures has been entered by means of the key board in the primary register, the contact closed in the fourth row of contacts in the primary register will upon depression of the operating key be automatically associated by means of the fourth relay in the reversing device with means for actuating a contact in the first row of contacts in the secondary register.

IV. Secondary register:—

The secondary register comprises 10 multiple contact relays with locking devices and magnetically operated ratchet mechanism therefor corresponding in construction to the relays, locking device and ratchet mechanism of the primary register.

The function of the secondary register is to close contacts upon current impulses in one of the sets of 10 digit lines and automatically lock said contacts in closed position and again release the same and lock them in open position when a different digit is entered, having the same denominational value. The operation of the secondary register will be described in detail with reference to the drawings.

V. Calculating mechanism:—

The calculating mechanism comprises 10 multiple contact relays, each of which is adapted when energized to connect the two sets of 10 digit lines of the machine in a particular combination. Thus, for example, in an adding machine, calculating relay No. 3 will connect a digit line in one set with the digit line in the other set, which has a numerical value 3 units higher than the first mentioned digit line etc. in accordance with the principle of calculation specified in U. S. application No. 688,564.

VI. Transfer mechanism:—

The transfer mechanism comprises two relays, viz. a locking relay which is actuated by means of the ratchet and locking mechanism of the secondary register and a transfer relay proper.

The function of the locking relay is to cut in the transfer relay proper in cases where the sum of two single digits is a two-digit number and the transfer relay proper performs the usual transfer operation of increasing the numerical value of the following digit or digits registered accordingly.

The detailed construction of the transfer locking relay will be seen on Figs. 6 and 7 and will be described with reference to these figures.

VII. Recording device:—

The recording device as illustrated comprises a set of two result relays, adapted to be operated by means of the result key on the key board. The function of the recording device is to actuate a recording mechanism, such as the type bar mechanism of a typewriter, so as to record the numbers entered into the machine for calculation and the result of the calculating operation performed.

Having now given a general outline of the several parts of the calculating machine and of the functions which they are adapted to perform, the more important mechanisms will be described in detail with reference to the detailed drawings.

Multiple contact relays with locking and ratchet mechanism:—

Figs. 2 and 3 illustrate in plan view and vertical cross section a multiple contact relay and the locking mechanism and the ratchet mechanism for successively actuating the locking mechanism.

Figs. 2 and 3 illustrate the mechanisms in connection with the primary register, but the description of these parts will suffice also for the corresponding mechanisms in connection with the secondary register which differs from the one described below only in a few details, which will be mentioned in connection with the secondary register.

The multiple contact relays illustrated are of the type specified in my U. S. application Ser. No. 181,223; but although it is considered preferable to use these relays, it will be obvious that the construction of the relay may be varied, and the invention is not limited to the use of any particular type of multiple contact relay.

Each relay A comprises a coil B, one terminal of which is permanently connected to the minus line of the battery, the relay being cut in and out by means of contacts connected in the lead from the other terminal to the plus line of the battery. The coil B is enclosed in a soft iron jacket C and has a central core D.

The armatures which also serve as contacts, comprise soft iron members E, mounted on plate springs F, which are fastened at their lower ends to insulator blocks G and connected up to the lines which they are adapted to close and interrupt.

At their upper ends the armatures are provided with contacts H, co-operating with stationary contacts I, mounted in insulator blocks J on the top of the relays. When a relay is energized, the armatures of the said relay, if not locked, will be drawn away from their normal position in which they rest against an insulated strip, fastened to the central core D, and will close the contact H. I.

The locking mechanism for the relay contacts comprises bell crank levers K pivoted on the top of the relays and provided at one end with noses L, co-operating with the upper ends of the plate springs F, so as to normally keep the armatures locked in the position illustrated on the drawings in which the contact between H. I. is interrupted.

The bell crank levers K with their other arms are all connected to locking bars M, so that a movement to the right, Fig. 3, i. e. in the direction of the arrow, of a locking bar M, will release all the contact armatures locked by means of the bell crank levers K connected to the said bar.

If one of the relays is cut in when the locking bar M is moved to the right (Fig. 3), the contact armature of that relay which is controlled by the said locking bar will be moved towards its corresponding stationary contact, and when the locking bar is then returned to its original position, the said contact armature will be locked by means of the nose L in its closed position, so that it remains in that position even after the relay is de-energized.

The calculating machine here specified being an adding machine adapted to work with numbers up to five digits, each multiple contact relay is provided with five locking contacts, corresponding respectively to units, tens, hundreds, thousands, and ten-thousands. As it will be readily understood, a machine adapted to perform additions with numbers. for instance up to 10 digits, will have to have multiple contact relays, each provided with 10 locking contacts etc.

There is one locking bar M for each series of locking contacts corresponding to the same denominational value. Thus, in the present machine there are five locking bars M, each connected to co-operate with one locking contact in each of the 10 multiple contact relays.

The device for actuating the locking bars M comprises a magnetically operated ratchet mechanism which is also illustrated on Figs. 2 and 3. The ratchet mechanism is actuated by means of two magnetic relays N and O which may be of any convenient type, but which are preferably constructed on the same lines as the multiple contact relays A, each having—however—only one pivoted armature respectively P and Q. The armature P of relay N is connected by means of bell crank lever R to a sliding ratchet bar S, co-operating with a pawl T, pivotally mounted on a sleeve U which is slidably, but not rotatably mounted on a rocking shaft V. A coil spring W tends to press sleeve U towards the position illustrated on the drawings. The sleeve U carries an arm X, the free end of which is provided with a downwardly extending knob Y of insulating material, adapted to co-operate with upwardly extending cam surfaces Z on the ends of the locking bars M. The arm X also carries a contact spring $a$, co-operating with stationary contacts $b$ mounted on a plate $c$ of insulating material.

The relay O which is the one illustrated in cross section on Fig. 3, has its armature Q connected at the top by means of rod $d$ to an arm $e$ on rocking shaft V.

When the magnetic relay N is energized, the armature P of that relay is moved in the direction indicated by the arrow on Fig. 2, and this movement by means of bell crank lever R causes the ratchet bar S to perform a movement in the direction indicated by the arrow, taking the sliding sleeve U with it in the same direction by means of pawl T. During this movement the knob Y will act on the cam surface Z so as to push the locking bar M towards the right, Fig. 3, i. e. in the direction indicated by the arrow against the action of compression springs $cs$ which are not illustrated on Figs. 2 and 3, but which are indicated on Fig. 1$b$. In case one of the multiple contact relays A is under current during this movement to the right of the locking bar, the corresponding contacts H and I will be closed, and as the locking bar M will slip back into its original position as soon as the knob Y has passed the cam surface Z, the said contacts H and I will be locked in its closed position. At the same time the contact bar M, slipping back into its original position, will lock the arm X so that it cannot return to its original position, even when ratchet bar S is moved back again. When relay N is de-energized, its armature P will be pulled back in its original position by means of spring $f$, acting on bell crank lever R so as to move ratchet bar S back to the position illustrated on the drawings.

During this movement the pivoted pawl T will slip over the second tooth on the ratchet bar and will come to rest against the active surface of the same.

When relay N is again energized, the same series of operations will be repeated, the knob Y now acting on the cam surface Z on the second locking bar M, etc., until all locking bars have been acted upon in succession.

The magnetic relay O serves to return sleeve U to its original position, and this operation takes place in the following manner:

When the relay O is energized, its armature Q will be pulled towards the left as indicated by the arrow Fig. 3, and will thereby turn the rocking shaft V, so that the arms X and e and the pawl T take up the position indicated in dotted lines on Fig. 3.

In this position the knob Y goes clear of the cams Z and the pawl T goes clear of the rachet bar S, so that the coil spring W is free to push sleeve U back to its original position, the contact spring a being at the same time lifted off the stationary contacts b. It is of course to be understood, in this connection, that the contact spring a is sufficiently flexible to be lifted off its contact b only when the knob Y goes clear of the bars M and the pawl T goes clear of the bar S; and further that the relay O is so constructed and/or the springs g and W so proportioned that the sleeve U will return to normal position before the armature Q is retracted by the spring g. The accomplishment of this condition is well within the knowledge of those skilled in the art, such for example as it is well understood by those skilled in the art that the relay may be made quick acting and slow releasing.

As soon as the magnetic relay O is again de-energized, a spring g will pull the rocking shaft V back to the position shown in full lines.

The multiple contact relays, besides the contacts co-operating with the locking and ratchet mechanisms, also comprise various other contact armatures for special purposes which will be specified in connection with the diagram on Figs. 1a to 1f.

The multiple relays of the calculating mechanism:—

These relays, one of which is illustrated in plan and vertical cross section respectively on Figs. 4 and 5, are of the same general type as the relays described above, except for the fact that they are not provided with any locking mechanism, and their construction will therefore be readily understood by referring to the description of the above mentioned relays.

The multiple calculating relay illustrated on Figs. 4 and 5 is the multiple calculating relay corresponding to the numeral 4.

The lines of one of the sets of 10 digit lines bearing the numbers 1, 2, 3, 4, 5, 6, 7, 8, 9, 0, are connected to the ten contact armatures of all the multiple contact relays as indicated on the drawings.

The lines of the other set of 10 digit lines are connected to the stationary contacts I of the multiple contact relays in accordance with the principle specified in my previous U. S. application No. 688,564, i. e. in the multiple relay corresponding to the numeral 4, the stationary contact I corresponding to the armature connected to digit line No. 1 of one set is connected to digit line No. 5 of the other set etc., the number of digit line connected to any stationary contact I thus representing the sum of the numeral of the multiple contact relay in question and the numeral of the contact armature corresponding with the said stationary contact. The contact armatures, the numeric value of which added to the numeric value of the multiple contact relay in question give a number higher than 9, are interconnected as illustrated on Fig. 5 with a second armature contact H.VI adapted to close the current in a transfer circuit for the purpose of increasing the numeric value of the next number registered by one. Thus each contact armature E is interconnected with another contact E.VI, co-operating with a stationary contact I.VI.

The manner in which a current in one of the transfer circuits acts to obtain the effect desired will be specified in connection with the diagram, Figs. 1a to 1f.

The locking relay of the transfer mechanism:—

This relay which is illustrated in Figs. 6 and 7 in plan and vertical cross section respectively is also constructed on the same lines as the relays previously described and comprises two locking armature contacts H.1.VI and H.2.VI as well as one contact armature H.56, having no locking mechanism.

The well known levers K acting to lock the locking armatures E of this relay in their two positions, are actuated by the locking bars M of the secondary register, said locking bars being provided with noses h, abutting against an edge of a plate i of insulating material carried on top of two pivoted arms j and the opposite edge of which abuts against the upstanding arm of the bell crank levers K.

In the position illustrated on the drawings, the free contact armature H56 and the locking contact armature H.2.VI of the locking transfer relay do not close any contact and accordingly act as ordinary interrupters, whereas the second locking armature contact H.1.VI as illustrated on Fig. 7 has the functions of a reversing switch being connected with a stationary contact I.1.VI in the position illustrated on the drawings and being connected with the stationary contact I'.1.VI when released by the locking device and attracted by the relay.

As it will be understood, all the locking bars M connected with the secondary register owing to the plate $i$ will, when moved in the direction indicated by the arrow, release the locking contact armatures E.

In the following the general outline and operation of the adding machine according to the present invention will be described with reference to the diagrammatic Figs. 1a to 1f.

The machine in accordance with the principle of calculation on which it is based comprises two sets of each 10 digit lines.

One of the sets of digit lines 1.V, 2.V, 3.V, 4.V, 5.V, 6.V, 7.V, 8.V, 9.V, 0.V starts from the interconnected stationary contacts I of the multiple contact relays A.1.IV, A.2.IV etc. of the secondary register, and as will be seen on the diagram are connected up to the 10 rows of contact armatures 1, 2, 3, 4, 5, etc. of the multiple contact relays A.1.V, A.2.V etc. of the calculating device.

The second set of digit lines 1.IV, 2.IV, 3.IV, 4.IV, ... 0.IV start from one of the coil terminals of the multiple contact relays in the secondary register, the opposite terminals of said coil being all directly connected up to the minus line of the battery. From said coils this second set of digit lines, as will be seen on the diagram, pass to the stationary contacts I of all the multiple relays A.V, being connected in each relay to a contact co-operating with a different armature, in accordance with the principle of calculation known from my aforesaid U. S. application No. 688,564.

The calculating relays A.1.V, A.2.V, etc. have one terminal of their coils connected directly up to the minus lead of the battery Ba, and the other terminals of their coils are connected by means of the lines 1, 2, 3, 4, etc. to the interconnected stationary contacts I of the multiple contact relays in the primary register.

From the plus lead of the battery Ba, the current passes to line 22, key-bar $t$, key K.O.1 (when depressed), line 12, contacts $m$ and $o$ in the secondary register, line 13, sleeve U.IV, contact $a$.IV, one of the contacts $r.1 \ldots r.5$ in the ratchet mechanism of the secondary register, one of the lines 17, 18, 19, 20 or 21, one of the armature contacts of the multiple contact relays A.1.III ... A.5.III in the reversing device and one of the lines 23, 24, 25, 26 or 27 to one of the locking bars M.1.II, M.2.II ... etc. of the primary register. From said locking bar which also serves as a conductor, the current passes through a flexible line (see dotted line Fig. 3) to the armature contacts H of said multiple contact relays and from there to the stationary contacts I of said relays and on to one of the lines 1, 2 ... 9, 0.

The operation of the calculating machine here illustrated and the function of its several parts will be best understood by referring to a concrete example of addition, and we will suppose that the following addition is to be performed, viz.

$$\begin{array}{r} 4699 \\ + \\ 5291 \\ + \\ 25 \\ \hline 10015 \end{array}$$

When the machine is ready for operation, the contacts H and I in relay A.0.IV are all closed, and as it will be seen in the following specification, this will always be the case when a calculating process has been terminated. The first step in the calculating operation now consists in depressing key 4. Current now passes from battery through lead 22, contact bar $t$, lead 4.I, coil of relay A.4.II and back to minus lead of battery. This energizes relay A.4.II, whereby contact H.11 of that relay is closed with contact I, 11 of that relay, connecting lead 4.I with lead 11. Through lead 11 current passes to the coil of relay N.II and back to the minus lead of battery. As described in connection with Fig. 3, the energization of relay N.II causes ratchet bar S.II to move sleeve U.II one step forward, reciprocating locking bar M.1.II of the primary register. As relay A.4.II is under current, the armature contact H.1 of that relay, when released will close with contact I.1 of the same relay and will immediately be locked in closed position as explained in connection with Figs. 2 and 3.

Next key No. 6 is depressed, energizing relay A.6.II and connecting lead 11 to the plus side of the battery in the same manner as above described, thus again energizing relay N.II, whereby sleeve U.II is advanced one further step, reciprocating locking bar M.2.II of the primary register. Consequently the armature contact H.2 of that relay will be locked in closed position with stationary contact I.2 of the same relay.

Next step consists in depressing key No. 9 which—in the same manner as above described—has the effect of locking armature contact H.3 in relay A.9.II with stationary contact I.3 in that relay, and then key 9 is depressed once more, causing armature contact H.4 in relay A.9.II to be locked in closed position with stationary contact I.4 in the same relay.

The next stage consists in depressing key K.O.I, connecting line 12 through contact bar $t$ with the plus lead of the battery. Current now passes from line 12 through lines 15 and 16, shaft VII (see Fig. 2), sleeve U.II contact spring $a$.II, contact $b$.4, line 31, through the coil of relay A.4.III and back to the minus lead of the battery, energizing relay A.4.III and closing all the contacts H and I of relay A.4.III.

While the key K.O.I is depressed the reversing device relay A.4.III remains closed and contact a.II remains stationary; the energizing line 31 passing from the stationary contact b.4 which is at this time in contact with the contact spring a.II, and serving to energize relay A.4.III.

Through line 12 current at the same time also passes to contacts l and m, in the ratchet mechanism of the secondary register. From contact m, the current passes over contact o and through line 13 to contact spring a.IV, the two tongues of which co-operate with the stationary contacts r.1 . . . r.6 and s.1 . . . s.5. Over contact r.1 the current passes through line 17 to stationary contact I.1.4.III in relay A.4.III, which—as stated above—is closed with armature contact H.1.4.III of that relay. Consequently, current passes over these contacts through line 26 to locking bar M.4.III of the primary register. From the said locking bar the current passes through the contacts H.4 and I.4 in relay A.9.II which are locked in closed position as explained above. From stationary contact I.4 in relay A.9.II current passes through line No. 9 to contact armatures H.9 and H.9' in relay A.2.VI, and as contact armature H.9 in that relay makes contact with the corresponding stationary contact I.9 in the same relay, when the relay is not energized the current continues on line 9, energizing relay A.9.V. The energizing of relay A.9.V has the effect of closing all the contacts in that relay.

The current from contact spring a.IV and stationary contact s.1 passes through locking bar M.1.IV, and as the contacts H and I of relay A.0.IV as above explained are all locked in closed position, the current from locking bar M.1.IV will pass through armature contact H.1.0.IV to contact I.1.0.IV and from there through line 0.V to all armature contacts in the lowest row of multiple contacts in calculating relays A.1.V . . . A.0.V.

Of these contacts, contact H.0.9.V is closed, and the current passes therefore to I.0.9.V and on the line 9.IV, energizing relay A.9.IV. At the same time current passes through line 41 to armature contact H.41 through stationary contact I.41, these contacts being closed owing to the energization of relay A.9.IV. Further the current passes on to armature contact H.43.9 and line 43. Also a self energizing circuit for A.9.IV is established from 12 through contacts l and n in the ratchet device of the secondary register over line 14 connected through I.41 and H.41, line 41 and line 9.IV.

Through line 43 current passes to the coil of relay N.IV, energizing the same.

The energization of relay N.IV as explained in connection with Figs. 2 and 3 will have the effect of advancing sleeve U.IV one step, at the same time reciprocating locking bar M.1.IV.

The movement of ratchet bar S.IV—as will be seen on the diagram—first has the effect of interrupting the contact between contact springs o.m, thus interrupting the connection between line 12 and line 13, cutting out one circuit to the relay A.9.IV. Relay A.9.IV is, however, still under current through line 14, contact I.41, contact H.41, line 41, line 9.IV, and when locking bar M.1.IV is reciprocated as stated above, armature contact H.1.9.IV will be locked in closed position with stationary contact I.1.9.IV. At the same time armature contact H.1.0.IV will spring back from stationary contact I.1.0.IV and will be locked in interrupted position.

It will be noted that the last digit, i. e. No. 9, entered into the machine by means of the key board, has now been entered as the first digit in the secondary register.

The movement of ratchet bar S.IV in the direction of the arrow, further—after a short interval of time—is caused to interrupt the contacts l and n—as will be seen on the diagram—and this causes the current in line 14 to be cut out a short interval of time after the current in line 13 was cut out, said interval being of sufficient length to permit the process of locking contacts H.1.9.IV and I.1.9.IV together in closed position to take place.

In other words, when the contacts a.IV carried by the sleeve U.IV are in the position shown in Fig. 1 the contacts l and n and m and o close the circuits heretofore described; but just as soon as the a.IV contacts pass from s.1 and r.1 on to s.2 and r.2 the contacts m and o are broken, thereby interrupting current on line 13, and a brief time interval thereafter, as soon as the bar M.1.IV has locked the contacts H.1.9.IV and I.1.9.IV, the contacts l and n are open interrupting line 14.

When contacts I.41, H.41 and H.43.9 have been interrupted by the de-energization of relay A.9.IV, no current can pass to the coil of this relay through line 14, even after contacts l.n have again been closed upon the return of ratchet bar S.IV to its original position. Also it will be seen that the de-energization of relay A.9.IV has the effect of interrupting the current through line 43 to the coil of relay N.IV, de-energizing that relay.

Contact spring a.IV now makes contact with stationary contacts s.2 and r.2, key K.O.I is still depressed and relay A.4.III is still energized with all contacts closed.

Current from line 12 now in the same manner as above described passes through contact r.2, line 18, contacts I.2.4.III and H.2.4.III, line 25, locking bar M.3.II, contacts I.3 and H.3 of relay A.9.II, line 9 to relay A.9.V, energizing that relay and closing all its contacts. From s.2 current passes through locking bar M.2.IV, contact armature H.2.0.IV, stationary contact I.2.0.IV, line 0.V, contact armature H.0.9.V, stationary contact I.0.9.V, line 9.IV and line 41, performing the same operations as above described with the result that sleeve U.IV is advanced one further step, locking bar M.2.IV is reciprocated, contacts H.2.0.IV and I.2.0.IV are interrupted and locked in the interrupted position, and contact H.2.9.IV is locked in closed position with I.2.9.IV.

Two of the digits have now been transferred from the primary register to the secondary register, and as key K.0.I is continuously maintained in depressed position, the remaining two digits of the number 4699 are transferred in the same manner from the primary register to the secondary register.

When all the four digits 4699 have been transferred in the manner specified from the primary register to the secondary register in the order 9964, sleeve U.IV will have advanced to a position in which contact spring a.IV makes contact with stationary contacts s.5 and r.5, and current will then pass from line 12, contacts m and o, through line 13, contact a.IV, contact r.5, line 21, contact I.5.4.III, armature contact H.5.4.III, line 44, armature contact H.1.VI stationary contact I.1.VI, line 45 to the coil of relay 0.II and through line 46 to the coil of the relay 0.IV, energizing these two relays.

As previously described, and as clearly shown on Figs. 7 and 1a to 1f these contacts H.1.VI and I.1.VI are closed by the resilient spring F when the locking relay A.1.VI is not energized and, when the bars M of register IV are in their normal position, are locked in closed position as illustrated in Fig. 7.

The energization of these two relays as explained in connection with Figs. 2 and 3 has the effect of automatically returning sleeves U.II and U.IV to their original position as illustrated on the diagram. When key K.O.I is now released, relays 0.II and 0.IV are de-energized, and sleeves U.II and U.IV slip back to the position illustrated on Fig. 3.

Now the digits of the first number to be added, i. e. the digits 5291 are entered into the primary register by successively depressing keys 5, 2, 9, 1, the operation of entering these digits in the primary register being exactly the same as the operation described in connection with the entering of the first digits, i. e. 4, 6, 9, 9, in the primary register.

It will be understood that, when a digit is entered in the primary register on the row corresponding to locking bar M.1.II the operation of that bar will not only have the effect as described above of locking the contacts H and I corresponding to the last digit in its relays, but will also release the contacts which were up to that moment maintained in locked position by means of the same locking bar.

After the second number has been entered in the primary register, contact a.II will be in position over stationary contact b.4, as the last number entered was one of four digits.

The subsequent depression of the key K.O.I will therefore have the effect as specified in connection with the first number entered of energizing relay A.4.III, and this relay is maintained energized with all its contacts closed, until key K.O.I is again released.

During the following description it should be borne in mind that the following contacts are locked in closed position in the primary register:

Under locking bar M.1.II contact in relay A.5.II.

Under locking bar M.2.II contact in relay A.2.II.

Under locking bar M.3.II contact in relay A.9.II.

Under locking bar M.4.II contact in relay A.1.II.

Key K.O.I being now maintained in depressed position, current passes in the same manner as explained before through line 12, and contacts l and n and o and m to lines 14 and 13 respectively.

The current in line 13 passes from contact s.1 to locking bar M.1.IV, and as contacts H.1.9.IV and I.1.9.IV are locked in closed position, line 9.V is connected with the plus lead of the battery. Through line 14 current passes to contact I.41 which is consequently also connected to the plus lead of the battery. From contact r.1, current goes through line 17, contacts I.1.4.III and H.1.4.III, line 26, locking bar M.4.II and contacts H and I in relay A.1.II, line 1 through relay A.2.VI to coil of relay A.1.V, energizing the latter. The plus current from line 9.V will therefore pass through armature contact H.9.1.V to stationary contact I.0.1.V and from armature contact H.9.1.VI to stationary contact I.0.1.VI.

From stationary contacts I.0.1.VI and I.0.1.V the current goes on to lines 55 and 42. The current in 42 energizes relay A.0.IV so that the contact armatures H.55, H.42 and H.43.0 are closed, with the respective contacts I.55 and I.42. The current in line 55 over contacts H.55 and I.55 passes on to line 56, energizing relay A.1.VI.

Through contacts H.42, I.42 and H.43.0, line 42 is connected with line 43, energizing relay N.IV which has the immediate effect as described in connection with the entering of the first number in the secondary register, locking contacts H.1.0.IV and I.1.0.IV in closed position in relay A.0.IV. At the same time the reciprocation of locking bar M.1.IV will act upon relay A.1.VI in the manner described in connection with Figs. 6 and 7, so as to release contact armature H.2.VI.

Relay A.1.VI being energized, contact H.2.VI will be locked in closed position with contact I.2.VI. Current will therefore pass from line 12 through line 15, contacts I.2.VI and H.2.VI, and line 57, energizing relay A.2.VI, so that this relay A.2.VI is maintained energized with all its contacts in the right hand position, until contacts H.2.VI and I.2.VI are again interrupted.

As sleeve U.IV has now been advanced one step, contact a.IV is now over r.2 and s.2.

From contact r.2 current passes through line 18, contact I.2.4.III, H.2.4.III and line 25, locking bar M.3.II, contact H.3 and I.3, line 9 to contact armatures H.9 and H.9'. As these armatures are now in their right hand position, contact H.9 is closed with contact I.0.VI, and armature H.9' is closed with contact I.58. The current through line 9 will therefore in relay A.2.VI be shunted on to line 0 through contact I.0.VI and to line 58 through contact I.58. The current in line 0 energizes relay A.0.V, and the current in line 58 passes over contacts I.58 and H.58, line 59 to line 56, energizing relay A.1.VI.

From contact s.2, current passes through locking bar M.2.IV, contacts H.2.9.IV and I.2.9.IV, line 9.V, contacts H.9.0.V and I.0.9.0.V, line 41 and line 9.IV, energizing relay A.9.IV. From line 41 current now passes as described before to line 43, energizing relay N.IV, etc.

The following two figures have now been transferred to and are locked in the secondary register 0 by means of contacts H.1.0.IV and I.1.0.IV and 9 by means of H.2.9.IV and I.2.9.IV; also the contacts H.1.VI and I.1.VI and H.2.VI and I.2.VI are still locked in the energized position of relay A.1.VI. Also relay A.2.VI is still energized with all its contacts in the right hand position (the position which is not shown in the diagram).

Sleeve U.IV, having now been advanced one step further, contact a.IV is over contacts s.3 and r.3. From r.3 current now passes through line 19, relay A.4.III, line 24, locking bar M.2.II, relay A.2.II, line 2 and relay A.2.VI, and as the armature contacts of this relay are in the right hand position, the current in line 2 will be transferred to line 3, energizing relay A.3.V and closing all the contacts of that relay.

From contact s.3 the current goes through locking bar M.3.IV, through relay A.6.IV, line 6.V to relay A.3.V where it is connected in accordance with the system on which the connection between the digit lines takes place to line 41 which is interconnected with line 9.IV, energizing relay A.9.IV so as to lock in accordance with the same operations which have previously been described the contacts H.3.9.IV, and I.3.9.IV in closed position. The same reciprocating movement of locking bar M.3.IV which serves to lock the two last named contacts in their closed position also has the effect of interrupting the corresponding contacts in relay A.6.IV and both contacts in relay A.1.VI. Relay A.2.VI is thereby de-energized, and all its contacts move back to the position illustrated on the diagram.

During the next step contact a.IV will be over contacts s.4 and r.4 and in the same manner as described before, relay A.5.V will be energized, connecting line 4.V to line 9.IV and line 41, so as to lock contacts H.4.9.IV and I.4.9.IV.

After this has taken place, relays O.II, O.IV receive current through lines 45 and 46 in the manner described above, and sleeves U.II and U.IV are automatically returned to their original position.

Key KO.I is now released, whereby relays O.II, O.IV are de-energized and the machine is ready for the entering of the next number that is 25.

This number is entered into the primary register by successively depressing keys 2 and 5, causing the same operations to take place which have already been specified in detail in connection with the first number entered.

After the depression of these keys, the contacts H and I under locking bar M.1.II are locked in closed position in relay A.2.II and contacts H and I are locked in closed position under locking bar M.2.II in relay A.5.II.

Key KO.I is now depressed and maintained in depressed position

Relay A.2.III is then energized through contact b.2 and line 29 and is maintained in energized state with all its contacts closed, until key KO.I is again released. Current now passes through line 12 and contacts l and n to line 14 and through contacts m and o to line 13, contact a.IV and contacts s.1 and r.1.

From contact r.1 current passes through line 17 to stationary contact I.1.2.III, contact H.1.2.III, line 24, locking bar M.2.II, relay A.5.II, line 5, relay A.2.VI, continues on line 5 and energizes relay A.5.V.

From contact s.1 current passes through locking bar M.1.IV, contacts H.1.0.IV and I.1.0.IV, line O.V, contact H.O.5.V, contact I.O.5.V and lines 37 and 5.IV.

The current in line 5.IV energizes relay A.5.IV, closing contact H.37, I.37 and H.43.5 to line 43, energizing relay N.IV.

The subsequent reciprocation of locking bar M.1.IV in the same manner as explained before, has the effect of releasing contacts H.1.0.IV and I.1.0.IV in the relay A.0.IV, which is not energized, and closing the corresponding contacts in relay A.5.IV which is energized, and then locking these contacts in their new position.

Contact a.IV is now over contacts s.2 and r.2, and current passes from r.2 through line 18, relay A.2.III, line 23, locking bar M.1.II, relay A.2.II, line 2, relay A.2.VI, the contact armatures of which are in their left hand position, continues on line 2 and energizes relay A.2.V.

From s.2 current goes through locking bar M.2.IV, contacts H.2.9.IV and I.2.9.IV, line 9.V to calculating relay A.2.V, where in accordance with the principle of coupling it is transferred to line 33, which is connected to line 1.IV.

At the same time connection is made in relay A.2.V in the same manner as previously specified in connection with relay A.1.V to line 47 with the result that as relay A.1.IV is energized, contacts H.33 and H.47 make contact respectively with contacts I.33 and I.47. Contact I.47 being connected to line 56, relay A.1.VI is energized and also line 33 is connected through contact H.33 and I.33 and H.43.1 to line 43, energizing relay N.IV.

The reciprocation of locking bar M.2.IV which now takes place according to the mode of operation previously described, has the effect of releasing the contacts H and I under that bar in relay A.1.IV, so that these contacts are closed owing to the relay being energized. At the same time the corresponding contacts in relay A.9.IV, which is not energized, are released from their closed position and the armature contacts H.1.VI and H.2.VI in relay A.1.VI are released in the manner described in connection with Figs. 6 and 7, thus energizing relay A.2.VI in the manner previously described, and connecting line 44 through contact armature H.1.VI and contact I'.1.VI to line 60, which is connected past relay A.2.VI to line 1 as seen on the diagram.

Contact a.IV now is over contacts s.3 and r.3. Current goes from r.3 through line 19, relay A.2.III, line 44, contact armature H.1.VI, contact I'.1.VI to line 1, energizing relay A.1.V.

From s.3 current passes through locking bar M.3.IV, contacts H.3.9.IV and I.3.9.IV, line 9.V, relay A.1.V and from there in the manner previously described in connection with relay A.1.V to lines 42 and 55, 42 being connected with line 0.IV, relay A.0.IV is energized and current passes then through line 42, contacts H.42, I.42 and H.43.0 to line 43, energizing relay N.IV and also through line 55, contacts H.55 and I.55 to line 56, energizing relay A.1.VI, so as to maintain the contact armatures of that relay in their right hand position.

After the reciprocation of locking bar M.3.IV, the contacts H.I under that bar in relay A.0.IV are locked in closed position, whereas the corresponding contacts in relay A.9.IV are locked in open position.

Contact a.IV is now over contacts s.4 and r.4. Current now passes from r.4 through line 20, relay A.2.III, line 44 etc. exactly as described in connection with the previous step, and at the same time current passes from S.4 through locking bar M.4.IV and relay A.9.IV also exactly as described in connection with the previous step, the result being that the contacts H and I under locking bar M.4.IV in relay A.0.IV are locked in closed position at the same time as the corresponding contacts in relay A.9.IV are released from their closed position and locked in their open position.

Contact a.IV is now over contacts s.5 and r.5, and current passes through line 21, relay A.2.III, line 44, contacts H.1.VI and I'.1.VI, line 60, line 1 to relay A.1.V energizing the latter.

From s.5 current passes through locking bar M.5.IV, and as the contacts H and I are still closed under this bar in relay A.0.IV as stated at the beginning, current goes through that relay, line 0.V, relay A.1.V to line 33, which is connected to line 1.IV.

This, as has been previously described in connection with the same relay, has the effect upon the reciprocation of locking bar M.5.IV to lock the contacts H and I in relay A.1.IV in their closed position, whereas at the same time the corresponding contacts in relay A.0.IV, which is not energized, are released from their closed position and locked in open position.

As line 56 has not been put under current during this operation, relay A.1.VI is de-energized during the reciprocation of locking bar M.5.IV, and consequently the contact armatures of that relay, when released, return automatically to their left hand position, cutting out relay A.2.VI.

At the next step contact a.IV arrives over contact r.6, and current passes through line 44, contacts H.1.VI and I.1.VI to line 45 and 46, energizing relays 0.II and 0.IV with the effect of returning both ratchet mechanism to their original position, as previously explained, whereupon key KO.I is released.

The adding process is now finished, and the result has been entered in the secondary register by locking the contacts H and I in relay A.5.IV under locking bar M.1.IV in relay A.1.IV under locking bar M.2.IV in relay A.0.IV under locking bars M.3.IV and M.4.IV and in relay A.1.IV under locking bar M.5.IV corresponding to the number 10015.

In order to obtain a permanent record of the result in a recording device, which as indicated on the drawings may consist in a number of magnetically operated type bars, only one of which is shown on the drawings, it is necessary to depress the result key K.R.I, whereby line 61 is connected to the plus side of the battery energizing relays A.1.VII, A.2.VII, at the same time connecting lines 15 and 12 to the plus side of the battery through contacts H.1.2.VII and I.1.2.VII.

As contact a.IV is now over contacts s.1 and r.1, current passes through line 17 to contact I.2.2.VII, contact H.2.2.VII, line 62, which is connected to line 42 and line O.IV, energizing relay A.O.IV. At the same time current passes from s.1 through locking bar M.1.IV, relay A.5.IV, line 5.V, and as none of the relays A.V are energized, the current continues only through line 5.VII through relay A.1.VII, the contacts of which are all closed in their right hand position during the energization of this relay and to the recording magnet v.5, operating type bar u.5 to record the digit 5, the movement of the type bar having the effect of moving the carriage of the typewriter one step in the right hand direction.

The current in line 42 having the effect as previously described, of energizing relay N.IV, the sleeve U.IV is advanced one step, and the other digits locked in closed position in the registering relays are transferred during the stepwise movement of sleeve U.IV to the recording device in exactly the same manner as described for the digit 5.

During this operation, relay A.O.IV is repeatedly energized and consequently the contacts H and I under all the locking bars in this relay will successively be locked in closed position, whereas at the same time the corresponding contacts locked in other unenergized relays are released and locked in open position.

After the recording process is finished and the sleeve U.IV has been returned to its original position in the manner previously described, the machine is ready for commencing a new calculation.

It will be seen on the diagram that relay A.1.VII besides the stationary contacts I.5.1.VII etc. are also provided with stationary contacts I.5'.1.VII etc. with which the contact armatures H.5.1.VII etc. of that relay engage when that relay is not energized by the depression of the result key K.R.I.

By means of these contacts and a set of lines 5'.VII etc. the lines 1, 2, 3, 4, 5, 6, 7, 8, 9, 0 are connected to the lines 5.VII etc. so as to make permanent record by means of the recording device of all the numbers entered in the machine by means of the key board every time the operating key KO.I is depressed. The necessary movement of the typewriter carriage for recording all numbers entered in the desired position on the paper may take place manually or by any known automatic means.

I claim.

1. In an electric calculating machine two sets of each ten digit lines corresponding to the digits of the numerical system, key controlled means for interconnecting said two sets of digit lines in ten combinations, a registering device comprising ten multiple contact relays each of which is adapted to be energized by current in one of the sets of digit lines, electrically operated means for locking the contacts and then releasing the same when a current is caused to pass through a digit line of the same set corresponding to a digit of the same denominational order and a recording device actuated by current impulses passing through contacts of the registering device for recording the result of the calculating operation.

2. In an electric calculating machine two sets of each ten digit lines corresponding to the digits of the numerical system, key controlled means for interconnecting said two sets of digit lines in ten combinations, a registering device comprising ten multiple contact relays each of which is adapted to be energized by current in one of the sets of digit lines, a number of magnetically operated locking bars each adapted to co-operate with one contact in each of said multiple contact relays for locking the contacts and then releasing the same when a current is caused to pass through a digit line of the same set corresponding to a digit of the same denominational order, and a recording device actuated by current impulses passing through contacts of the registering device for recording the result of the calculating operation.

3. In an electric calculating machine two sets of each ten digit lines corrresponding to the digits of the numerical system, key controlled means for interconnecting said two sets of digit lines in ten combinations, a registering device comprising ten multiple contact relays each of which is adapted to be energized by current in one of the sets of digit lines, a number of magnetically operated locking bars, each adapted to co-operate with locking pawls co-operating with a moveable member of one contact respectively in each of said multiple contact relays for locking the contacts and then releasing the same when a current is caused to pass through a digit line of the same set corresponding to a digit of the same denominational order and a recording device actuated by current impulses passing through contacts of the registering device for recording the results of the calculating operation.

4. In an electric calculating machine two sets of each ten digit lines corresponding to the digits of the numerical system, key controlled means for interconnecting said two sets of digit lines in ten combinations, a registering device comprising ten multiple contact relays each of which is adapted to be energized by current in one of the sets of digit lines, a number of magnetically operated locking bars, each actuated by current in one of the sets of digit lines adapted to co-operate with one contact in each of said multiple contact relays for locking the contacts and then releasing the same when a current is caused to pass through a digit line of the same set corresponding to a number of the same denominational order, and a recording device actuated by current impulses passing through contacts of the registering device for recording the result of the calculating operation.

5. In an electric calculating machine two sets of each ten digit lines corresponding to the digits of the numerical system, key controlled means for interconnecting said two sets of digit lines in ten combinations, a registering device comprising ten multiple contact relays each of which is adapted to be energized by current in one of the sets of digit lines, a number of magnetically operated locking bars each actuated by current in one of the sets of digit lines, contacts in each of the multiple contact relays of said registering device for cutting in said locking bar actuating device when one of said relays is energized, means for connecting each locking bar with one contact in each of said multiple contact relays for locking the contacts and then releasing the same when a current is caused to pass through a digit line of the same set corresponding to a digit of the same denominational order and a recording device actuated by current impulses passing through contacts of the registering device for recording the result of the calculating operation.

6. In an electric calculating machine two sets of each ten digit lines corresponding to the digits of the numerical system, key controlled means for interconnecting said two sets of digit lines in ten combinations, a registering device comprising ten multiple contact relays, each having a plurality of movable contacts cooperating with a plurality of stationary contacts and each of which relays is adapted to be energized by current in one of the sets of digit lines, a number of locking bars each adapted to co-operate with locking pawls co-operating respectively with one moveable contact in each of said multiple contact relays for locking the contacts closed and then releasing the same when a current is caused to pass through a digit line of the same set corresponding to a digit of the same denominational order, actuating mechanism common to all said locking bars and adapted to actuate the same successively, and a recording device actuated by current impulses passing through contacts of the registering device for recording the result of the calculating operation.

7. In an electric calculating machine two sets of each ten digit lines corresponding to the digits of the numerical system, key controlled means for interconnecting said two sets of digit lines in ten combinations, a registering device comprising ten multiple contact relays, each having a plurality of movable contacts cooperating with a plurality of stationary contacts and each of which relays is adapted to be energized by current in one of the sets of digit lines, a number of locking bars each adapted to co-operate with locking pawls co-operating respectively with one moveable contact in each of said multiple contact relays for locking the contacts closed and then releasing the same when a current is caused to pass through a digit line of the same set corresponding to a digit of the same denominational order, actuating mechanism common to all said locking bars, comprising a sliding sleeve, a cam thereon for engaging cam surfaces on the locking bars to reciprocate the same successively, means for causing said sleeve to move one step in one direction each time a current impulse is transmitted to the said actuating mechanism, and a recording device actuated by current impulses passing through contacts of the registering device for recording the result of the calculating operation.

8. In an electric calculating machine two sets of each ten digit lines corresponding to the digits of the numerical system, key controlled means for interconnecting said two sets of digit lines in ten combinations, a registering device comprising ten multiple contact relays each having a plurality of movable contacts cooperating with a plurality of stationary contacts and each of which relays is adapted to be energized by current in one of the sets of digit lines, a number of locking bars each adapted to co-operate with locking pawls co-operating respectively with one moveable contact in each of said multiple contact relays for locking the contacts and then releasing the same when a current is caused to pass through a digit line of the same set corresponding to a digit of the same denominational order, an actuating mechanism common to all said locking bars, a rocking shaft, a slideable spring actuated sleeve thereon, co-operating cam surfaces on said sleeve and said locking bars for causing the sleeve to reciprocate the said bars, a magnetic relay and a ratchet and pawl mechanism for giving said sleeve a stepwise movement in one direction, and a second relay acting to rock said shaft so as to disengage said sleeve from the locking bars and ratchet mechanism and permitting it to be returned by means of said spring to its original position.

9. In an electric calculating machine two sets of each ten digit lines corresponding to the digits of the numerical system, key controlled means for interconnecting said two sets of digit lines in ten combinations, a registering device comprising ten multiple contact relays each having a plurality of movable contacts co-operating with a plurality of stationary contacts connected to one set of digit lines each of which relays is adapted to be energized by current in the other of the sets of digit lines, a number of locking bars each adapted to co-operate with locking pawls co-operating respectively with one moveable contact in each of said multiple contact relays for locking the contacts and then releasing the same when a current is caused to pass through a digit line energizing a relay corresponding to a digit of the same denominational order, an actuating mechanism common to all said locking bars and comprising a sliding sleeve, a cam thereon for engaging cam surfaces on the locking bars to reciprocate the same successively, magnetically actuated means for causing said sleeve to move one step in one direction each time a current impulse is transmitted to the said actuating mechanism, and a contact on said sleeve co-operating with stationary contacts for activating the lines connected with one of the registering relay contacts, said last-mentioned contact being actuated by the locking bar reciprocated simultaneously with the movement of said sleeve.

10. In an electric calculating machine a primary register comprising ten multiple contact relays, each provided with a number of contacts corresponding to the number of denominational orders in the largest number to be dealt with in the machine, means for locking one contact in each row of contacts corresponding to a certain denominational order, in closed position, a reversing mechanism comprising a number of multiple contact relays corresponding to said number of contacts in each register relay and provided with the same number of contacts, means actuated by the primary register for energizing the reversing relay corresponding to the denominational value of the number entered in the primary register, a secondary register comprising multiple contact relays corresponding to the multiple contact relays of the primary register, said multiple contact relays of the primary and secondary registers being connected to the relays of the reversing device in such a manner that a current impulse through a contact corresponding to the last number entered in the primary register will actuate a contact in the first row of contacts in the secondary register.

11. In an electric calculating machine a primary register comprising ten multiple contact relays, each provided with a number of contacts corresponding to the number of denominational orders of the largest number to be dealt with in the machine, means for locking one contact in each row of contacts corresponding to a certain denominational order in closed position, a reversing mechanism comprising a number of multiple contact relays corresponding to the number of contacts in each register relay and each of said reversing relays being provided with the same number of denominational contacts, means actuated by the primary register for energizing the reversing relay corresponding to the denominational value of the number entered in the primary register lines interconnecting all the contacts corresponding to the same denominational order in the multiple contact relays of the primary register, a secondary register comprising multiple contact relays corresponding to the multiple contact relays of the primary register, lines interconnecting all the contacts corresponding to the same denominational order in the multiple contact relays of the secondary register and lines connecting the moveable and stationary contacts respectively of the multiple contact relays of the reversing device with the said interconnecting lines of primary and secondary registers in such a manner that a current impulse through a contact corresponding to the last digit entered in the primary register will actuate a contact in the first row of contacts in the secondary register.

12. In an electric calculating machine two sets of each ten digit lines corresponding to the digits of the numerical system, key controlled means for interconnecting said two sets of digit lines in ten combinations, a transfer device adapted to increase the numerical value of the next figure of a sum recorded by one when the sum of the two preceding figures is a two-figured number, a registering device comprising ten multiple contact relays each of which is adapted to be energized by current in one of the sets of digit lines, electrically operated means for locking the contacts and then releasing the same when a current is caused to pass through a digit line of the same set corresponding to a digit of the same denominational order, and a recording device actuated by current impulses passing through contacts of the registering device for recording the result of the calculating operation.

13. In an electric calculating machine two sets of each ten digit lines corresponding to the digits of the numerical system, ten key controlled multiple contact relays for interconnecting said two sets of digit lines in ten combinations, a set of transfer lines, contacts on said multiple contact relays for cutting in said transfer lines in parallel with any interconnected pair of digit lines the sum of which is a two-figured number, a transfer device adapted when energized to increase the numerical value of the next figure of a sum recorded by one, means for energizing said transfer device when any of the transfer lines is put under current, a registering device comprising ten multiple contact relays each of which is adapted to be energized by current in one of the sets of digit lines, electrically operated means for locking the contacts closed and then releasing the same when a current is caused to pass through a digit line of the same set corresponding to a digit of the same denominational order, and a recording device actuated by current impulses passing through contacts of the registering device for recording the result of the calculating operation.

14. In an electric calculating machine two sets of each ten digit lines corresponding to the digits of the numerical system, ten key controlled multiple contact relays for interconnecting said two sets of digit lines in ten combinations, a set of transfer lines, contacts on said multiple contact relays for cutting in said transfer lines in parallel with any interconnected pair of digit lines the sum of which is a two-figured number, a transfer device comprising a locking transfer relay energized by means of current in any transfer line, and a multiple contact switch relay energized by means of a contact in the locking transfer relay for switching each of the ten actuating lines for the interconnecting multiple contact relays on to a line leading to a calculating relay corresponding to a figure one unit higher than the relay normally actuated by said actuating line, a registering device comprising ten multiple contact relays, each of which is adapted to be energized by current in one of the sets of digit lines, electrically operated means for locking the contacts and then releasing the same when a current is caused to pass through a digit line of the same set corresponding to a digit of the same denominational order and a recording device actuated by current impulses passing through contacts of the registering device for recording the result of the calculating operation.

15. In an electric calculating machine, a plurality of sets of digit lines each set of which corresponds to the digits of a numerical system, key controlled means for interconnecting said sets of digit lines in various combinations, a registering means comprising multiple contact relays adapted to be energized by current in one of the sets of digit lines, and means for locking a contact closed and then releasing the same when a current is caused to pass through a digit line of the said one set corresponding to a digit of the same denominational order.

16. In an electric calculating machine two sets of each ten digit lines corresponding to the digits of the numerical system, key controlled means for interconnecting said two sets of digit lines in ten combinations, registering mechanism comprising ten multiple contact relays each of which is adapted to be energized by current in one of the sets of digit lines, a number of locking bars each adapted to operate locking pawls cooperating respectively with the movable member of one contact in each of said multiple contact relays for locking the contacts closed and then releasing the same when a current is caused to pass through a digit line of the same set corresponding to a digit of the same denominational order.

17. In an electric calculating machine two sets of each ten digit lines corresponding to the digits of the numerical system, means for interconnecting said two sets of digit lines in ten combinations, a registering device comprising ten multiple contact relays each of which is adapted to be energized by current in one of the sets of digit lines, a number of locking bars each actuated by current in one of the sets of digit lines, contacts in each of the multiple relays of said registering device for closing the actuating circuit for said locking bar when one of the said relays is energized, means operated by each locking bar for retaining the position of one contact in each of said multiple contact relays by locking the contacts and then releasing the same when a current is caused to pass through a digit line of the same set corresponding to a digit of the same denominational order, and a recording device actuated by current impulses passing through the contacts of the registering device for recording the result of the calculating operation.

18. In an electric calculating machine two sets of each ten digit lines corresponding to the digits of the numerical system, key controlled means for interconnecting said two sets of digit lines in ten combinations, a registering device comprising ten multiple contact relays each of which is adapted to be energized by current in one of the sets of digit lines, a number of locking bars each adapted to cooperate with locking pawls cooperating respectively with a movable member of one contact in each of said multiple contact relays for locking the contacts and then releasing the same when a current is caused to pass through a digit line of the same set corresponding to a digit of the same denominational order, actuating mechanism common to all said locking bars of said registering device and adapted to actuate the said bars successively, and a recording device actuated by current impulses passing through the contacts of the registering device for recording the result of the calculating operation.

19. In an electric calculating machine two sets of each ten digit lines corresponding to the digits of the numerical system, key controlled means for interconnecting said two sets of digit lines in ten combinations, a registering device comprising ten multiple contact relays each of which is adapted to be energized by current in one of the sets of digit lines, said relays each having corresponding stationary and movable armature contacts representing denominational orders, a number of locking bars each adapted to actuate locking pawls for alternately locking and releasing in the same denominational order the respective contact armatures of said multiple contact relays when a current is caused to pass through a digit line of the same set corresponding to a digit of the same denominational order, actuating mechanism common to all said locking bars of said registering device and comprising a sliding sleeve having a cam thereon for engaging cam surfaces on the locking bars to reciprocate the same successively and means for causing said sleeve to move one step in one direction each time a current impulse is transmitted to the said actuating mechanism.

20. In an electric calculating machine two sets of each ten digit lines corresponding to the digits of the numerical system, key controlled means for interconnecting said two sets of digit lines in ten combinations, a registering device comprising ten multiple contact relays each of which is adapted to be energized by current in one of the sets of digit lines, said relays each having corresponding stationary and movable armature contacts representing denominational orders, a number of locking bars each adapted to actuate locking pawls for alternately locking and releasing in the same denominational order the respective contact armatures of said multiple contact relays when a current is caused to pass through a digit line of the same set corresponding to a digit of the same denominational order, and means for successively reciprocating said locking bars.

21. In an electric calculating machine two sets of each ten digit lines coresponding to the digits of the numerical system, key controlled means for interconnecting said sets of digit lines in ten combinations, a registering device comprising ten multiple contact relays each of which is adapted to be energized by current in one of the sets of digit lines, a number of magnetically operated locking bars each adapted to cooperate with locking pawls for one contact armature in each relay so as to release the same for a short interval of time when a current is caused to pass through a digit line of the same set coresponding to a digit of the same denominational order, and actuating mechanism common to all said locking bars for said registering device, comprising a sliding sleeve having a cam thereon for engaging cam surfaces on the locking bars to reciprocate the same successively, a ratchet bar reciprocable by electrical means, a pawl on said sleeve cooperating with said ratchet bar for preventing return movement of said sleeve after each step in order to cause the said sleeve to move one step in one direction each time a current impulse is transmitted to the actuating mechanism.

22. In an electric calculating machine a registering device comprising ten multiple contact relays each of said relays having a number of contacts corresponding respectively to the number of denominational orders of the largest number to be dealt with in the machine, means for locking in closed position one contact in each row of denominational contacts, said rows corresponding respectively to certain denominational orders, a reversing mechanism comprising a number of multiple contact relays corresponding in number to the number of denominational contacts in each registering relay and each provided with a plurality of contacts, means actuated by the registering device for energizing the reversing relay corresponding to the denominational value of the number entered in the registering device, a second registering device comprising multiple contact relays corresponding to the multiple contact relays of the first registering device, said multiple contact relays of the said two registering devices being connected to the relays of the reversing device in such a manner that a current impulse through a contact corresponding to the last digit entered in the first registering device will cause the closing and locking of a first contact in each of the relays in said second registering device.

23. In an electric calculating machine a registering device comprising ten multiple contact relays each of said relays having a number of contacts corresponding respectively to the number of denominational orders of the largest number to be dealt with in the machine, means for locking in closed position one contact in each row of denominational contacts, said rows corresponding respectively to certain denominational orders, a reversing mechanism comprising a number of multiple contact relays corresponding in number to the number of denominational contacts in each registering relay and each provided with a plurality of contacts, means actuated by the registering device for energizing the reversing relay corresponding to the denominational value of the number entered in the registering device, a second registering device comprising multiple contact relays corresponding to the multiple contact relays of the first registering device, said multiple contact relays of the said two registering devices being connected to the relays of the reversing device in such a manner that a current impulse through a contact corresponding to the last digit entered in the first registering device will cause the closing of a contact in the first row of denominational contacts in said second registering device.

24. In an electric calculating machine a primary registering device comprising ten multiple contact relays each provided with a number of contacts corresponding to the number of denominational orders of the largest number to be dealt with in the machine, means for locking one contact in each row of denominational contacts corresponding respectively to certain denominational orders in closed position, a reversing mechanism comprising a number of multiple contact relays corresponding respectively to the number of denominational contacts in each registering relay and each provided with a plurality of stationary and movable contacts, means actuated by the said registering device for energizing the reversing relay corresponding to the denominational value of the number entered in the same, lines interconnecting all the contacts corresponding to the same respective denominational orders in the multiple contact relays of the said registering device, a secondary registering device comprising multiple contact relays corresponding to the multiple contact relays of the primary registering device, lines interconnecting all the contacts corresponding to the same denominational order in the multiple contact relays of each registering device and lines connecting the movable and stationary contacts respectively of the multiple contact relays of the reversing device with the said interconnecting lines of the primary and secondary registering devices in such a manner that a current impulse through a contact corresponding to the last digit entered in the primary registering device will cause the closing and locking of a first contact in each of the relays in said secondary registering device.

25. In an electric calculating machine a primary registering device comprising ten multiple contact relays each provided with a number of contacts corresponding to the number of denominational orders of the largest number to be dealt with in the machine, means for locking one contact in each row of denominational contacts corresponding respectively to certain denominational orders in closed position, a reversing mechanism comprising a number of multiple contact relays corresponding respectively to the number of denominational contacts in each registering relay and each provided with a plurality of stationary and movable contacts, means actuated by the said registering device for energizing the reversing relay corresponding to the denominational value of the number entered in the same, lines interconnecting all the contacts corresponding to the same respective denominational orders in the multiple contact relays of the said registering device, a secondary registering device comprising multiple contact relays corresponding to the multiple contact relays of the primary registering device, lines interconnecting all the contacts corresponding to the same denominational order in the multiple contact relays of each registering device, and lines connecting the movable and stationary contacts respectively of the multiple contact relays of the reversing device with the said interconnecting lines of the primary and secondary registering devices, in such a manner that a current impulse through a contact corresponding to the last digit entered in the primary registering device will cause the closing of a contact in the first row of denominational contacts in said secondary registering device.

26. In an electric calculating machine two sets of digit lines corresponding to the digits of a numerical system and common to a plurality of denominational orders, key controlled means for interconnecting said two sets of digit lines in various combinations, a transfer device adapted to increase the numerical value of a digit in a result of an addition process by one when the sum of the two preceding digits of the addenda is a two-figured number, a registering device comprising multiple contact relays each of which is adapted to be energized by current in one of the sets of digit lines, and electrically operated means for locking the contacts of respective denominational orders closed and then releasing the same when a current is caused to pass through a digit line of the same set corresponding to a digit of the same denominational order.

27. In an electric calculating machine two sets of each ten digit lines corresponding to the digits of the numerical system, ten key controlled multiple contact relays for interconnecting said two sets of digit lines in ten combinations, a registering device comprising ten multiple contact relays, each of which is adapted to be energized by current in one of the sets of digit lines, electrically operated means for locking the contacts of respective denominational orders closed and then releasing the same when a current is caused to pass through a digit line of the same set corresponding to a digit of the same denominational order, and a recording device actuated by current impulses passing through the closed contacts of the registering device for recording the result of the calculating operation.

28. In an electric calculating machine two sets of each ten digit lines corresponding to the digits of the numerical system, ten key controlled multiple contact relays for interconnecting said two sets of digit lines in ten combinations, a set of transfer lines, contacts on said multiple contact relays for connecting said transfer lines in parallel with any interconnected pair of digit lines representing digits the sum of which is a two-figured number, a transfer device adapted when energized to increase the numerical value of a digit in a sum by one, means for energizing said transfer device when any of the transfer lines is put under current, a registering device comprising ten multiple contact relays, each of which is adapted to be energized by current in one of the sets of digit lines, electrically operated means for locking the contacts of respective denominational orders closed and then releasing the same when a current is caused to pass through a digit line of the same set corresponding to a digit of the same denominational order, and a recording device actuated by current impulses passing through the closed contacts of the registering device for recording the result of the calculating operation.

29. In an electric calculating machine two sets of each ten digit lines corresponding to the digits of the numerical system, means for interconnecting said two sets of digit lines in ten combinations, a registering device comprising ten multiple contact relays each of which is adapted to be energized by current in one of the sets of digit lines, electrically operated means for locking certain of said contacts closed and then releasing the same when a current is caused to pass through a digit line of the same set corresponding to a digit of the same denominational order, and a recording device actuated by current impulses passing through the contacts of the registering device for recording the result of the calculating operation.

30. In an electric calculating machine two sets of each ten digit lines corresponding to the digits of the numerical system, means for interconnecting said two sets of digit lines in ten combinations, a registering device comprising ten multiple contact relays each of which is adapted to be energized by current in one of the sets of digit lines, a number of magnetically operated locking bars each adapted to cooperate with one contact in each of said multiple contact relays for locking certain of said contacts closed and then releasing the same when a current is caused to pass through a digit line of the same set corresponding to a digit of the same denominational order, and a recording device actuated by current impulses passing through the contacts of the registering device for recording the result of the calculating operation.

31. In an electric calculating machine sets of calculating switches, adapted to connect electric digit circuits in accordance with the addition table, a registering device comprising relay operated multiple contact switches, means for locking the movable members of said registering switches in open or closed position, the number of registering switches and the number of contacts controlled by each switch corresponding respectively to the number of digits in the numerical system and the denominational capacity of the machine.

32. In an electric calculating machine two sets of digit lines corresponding to the digits of a numerical system, key controlled means for interconnecting said two sets of digit lines in various combinations, registering means comprising multiple contact relays each adapted to be energized by current in one of the sets of digit lines, a number of reciprocating locking bars each adapted to cooperate with locking pawls cooperating respectively with a movable member of one contact in each of said multiple contact relays for locking certain contacts closed and then releasing the same when a current is caused to pass through a digit line of the same set corresponding to a digit of the same denominational order, actuating mechanism common to a plurality of said locking bars for said registering means and comprising a rocking shaft, a slidable spring actuated sleeve thereon, cooperating portions on said sleeve and said locking bars for causing the sleeve to reciprocate the said bars, and means for giving said sleeve a stepwise movement in one direction and returning the same to its original position after a predetermined number of steps, and contacts actuated by said sleeve to open and close circuits through said digit lines and multiple contact relays.

33. In an electric calculating machine two sets of digit lines corresponding to the digits of the numerical system, key controlled means for interconnecting said two sets of digit lines in various combinations, registering means comprising multiple contact relays each adapted to be energized by current in one of the sets of digit lines, a number of reciprocating locking bars adapted to cooperate respectively with locking pawls cooperating with the movable member of one contact in each of said multiple contact relays for locking certain contacts closed and then releasing the same when a current is caused to pass through a digit line of the same set corresponding to a digit of the same denominational order, mechanism common to all said locking bars of said registering means and comprising a rocking shaft, a slidable spring actuated sleeve thereon, cooperating portions on said sleeve and said locking bars for causing the sleeve to reciprocate the said bars, a reciprocating ratchet bar engaging a pawl on said sleeve for giving it a stepwise movement in one direction, means for returning the sleeve to its original position after a predetermined number of steps, contacts controlled by said reciprocating ratchet bar and contacts controlled by said sleeve to open and close circuits through said digit lines and multiple contact relays.

34. In an electric calculating machine a number of multiple contact relays corresponding to the digits of a numerical system, a number of armatures in each relay, each armature corresponding to a certain denominational order, locking means engaging an armature in each multiple contact relay corresponding to the same denominational order for maintaining said armatures locked in their position, means for actuating said locking means in succession so as to release a contact armature in each multiple contact relay for a short period, and means controlled by said actuating means for closing and interrupting circuits associated with said multiple contact relays.

35. In an electric calculating machine a number of multiple contact relays corresponding to the digits of the numerical system, a number of armatures in each relay, each armature corresponding to a certain denominational order, reciprocating locking bars common to all relays for locking contact armatures corresponding to the same denominational order in their position, means for successively reciprocating said locking bars so as to release a contact armature in each multiple contact relay for a short period, electric circuits for energizing said multiple contact relays and controlled by the said locking contact armatures, and contacts controlled by said reciprocating means for opening and closing said electric circuits.

36. In an electric calculating machine a number of multiple contact relays corresponding respectively to the digits of a numerical system, a number of armatures in each relay, each armature corresponding to a certain denominational order, sets of digit lines corresponding to the digits of the numerical system, means for interconnecting said digit lines in various combinations, electric circuits comprising said digit lines for energizing said multiple contact relays, locking means engaging an armature in each multiple contact relay corresponding to the same denominational order for maintaining said armatures locked in their position, means for actuating said locking means in succession so as to release a contact armature in each multiple contact relay for a short period, and means controlled by said actuating means for closing and interrupting said circuits.

37. In an electrical calculating machine, a series of multiple contact relays, a series of movable contact armatures in each relay, the number of units of the first of said series corresponding respectively to the number of digits of a numerical system and the number of units of the second of said series corresponding respectively to the number of denominational orders, locking means engaging a corresponding armature in each relay for maintaining said armatures locked in their position, means for actuating said locking means in succession so as to release a contact armature in each multiple contact relay for a short period, and means controlled by said actuating means for interrupting circuits associated with said multiple contact relays.

38. In an electrical calculating machine, a series of multiple contact relays each having a series of movable contact armatures, the number of units of the first of said series corresponding respectively to the number of digits of a numerical system and the number of units of the second of said series corresponding respectively to the number of denominational orders, locking means engaging a corresponding armature in each relay for maintaining said armatures locked in their position, means for actuating said locking means in succession so as to release a contact armature in each multiple contact relay for a short period, and means controlled by said actuating means for denominationally altering circuit connections associated with said multiple contact relays.

39. In a machine of the class described, the combination of a single series of digit keys, a source of electrical energy, a single series of relays corresponding to said keys, denominationally arranged circuit closing digit armature contacts associated with each relay, means for connecting said relays to said source of energy by depression of the respective keys and means for controlling said contracts to operate in denominational sequential order as said relays are energized successively.

40. In a machine of the class described, the combination of a plurality of item keys, a source of electrical energy, a plurality of relays corresponding to said keys, a movable contact in each relay adapted to be closed by energization of said relay, means for energizing said relays by depression of corresponding keys, and means for mechanically locking a closed contact in closed position.

41. In a machine of the class described, the combination of a plurality of item keys, a source of electrical energy, a plurality of relays corresponding to said keys, a contact armature in each relay adapted to be closed by energization of said relay, means for energizing any one of said relays by depression of the corresponding key, mechanical means for locking the closed contact armature in closed position, and means controlled by the energization of said relay for actuating said locking means.

42. In a machine of the class described, the combination of a plurality of item keys, a source of electrical energy, a plurality of relays corresponding to said keys, a contact armature in each relay adapted to be closed by energization of said relay, means for energizing any one of said relays by depression of the corresponding key, means for locking the closed contact armature in closed position, a second contact armature in each of said relays, and means set in operation by the closing of said second contact armature for actuating said locking means.

43. In a machine of the class described, the combination of a plurality of item keys, a source of electrical energy, a plurality of relays corresponding to said keys, a contact armature in each relay adapted to be closed by energization of said relay, means for energizing any one of said relays by depression of the corresponding key, means for locking the closed contact armature in closed position, and a magnet energized by a circuit made upon energization of said relay for actuating said locking means.

44. In a machine of the class described, the combination of a plurality of item keys, a source of electrical energy, a plurality of relays corresponding to said keys, a contact armature in each relay adapted to be closed by energization of said relay, means for energizing any one of said relays by depression of the corresponding key, means for locking the closed contact armature in closed position and the open contact armatures in open position, and a magnet energized by a circuit made upon energization of said relay for actuating said locking means.

45. In a machine of the class described, the combination of a plurality of keys, a corresponding number of relays, an electrical source of energy, means for connecting said relays to said source of energy by depression of corresponding keys, a normally open contact armature associated with each relay, a locking bar common to the contact armatures of all of said relays, and means set in operation by energization of any relay for actuating said locking bar to lock the contact armature associated with the energized relay in closed position.

46. In a machine of the class described, the combination of a plurality of keys, a corresponding number of relays, an electrical source of energy, means for connecting said relays to said source of energy by depression of corresponding keys, a normally open contact armature associated with each relay, a locking bar common to the contact armatures of all of said relays, a magnet for operating said locking bar to lock the contact armature associated with the energized relay in closed position, and a circuit for said magnet adapted to be made upon energization of any one of said relays.

47. In a machine of the class described, the combination of a plurality of keys, a corresponding number of relays, an electrical source of energy, means for connecting said relays to said source of energy by depression of corresponding keys, a normally open contact armature associated with each relay, a locking bar common to the contact armatures of all of said relays, a magnet for operating said locking bar to lock the contact armature associated with the energized relay in closed position, and means for automatically energizing said last mentioned magnet after energization of any one of said relays.

48. In a machine of the class described, the combination of a plurality of keys, a corresponding number of relays individual to said keys, means for energizing any one of said relays upon depression of the corresponding key, a plurality of normally open denominational contact armatures associated with each relay and adapted to be closed upon energization of said relay, and automatic means for locking the closed contact armatures corresponding to the denomination of the digit entered in closed position.

49. In a machine of the class described, the combination of a plurality of keys, a corresponding number of relays individual to said keys, means for energizing any one of said relays upon depression of the corresponding key, a plurality of normally open denominational contact armatures associated with each relay and adapted to be closed upon energization of said relay, a plurality of locking means each associated with all the contact armatures of the same denomination in the several relays, and automatic means for actuating the locking means corresponding to the denominational order of the digit entered.

50. In a machine of the class described, the combination of a plurality of keys, a corresponding number of relays individual to said keys, means for energizing any one of said relays upon depression of the corresponding key, a plurality of normally open denominational contact armatures associated with each relay and adapted to be closed upon energization of said relay, a plurality of locking bars each associated with all of the contact armatures of the same denominational order, and automatic means for actuating the locking bar corresponding to the denomination of the digit entered.

51. In a machine of the class described, the combination of a plurality of keys, a corresponding number of relays individual to said keys, means for energizing any one of said relays upon depression of the corresponding key, a plurality of normally open denominational contact armatures associated with each relay and adapted to be closed upon energization of said relay, a locking bar associated with all of the contact armatures of each denominational order, and automatic means for actuating said locking bars in denominational sequence as a number is indexed by the keys in denominational sequence.

52. In a machine of the class described, the combination of a plurality of keys, a corresponding number of relays individual to said keys, means for energizing any one of said relays upon depression of the corresponding key, a plurality of normally open denominational contact armatures associated with each relay and adapted to be closed upon energization of said relay, a locking bar associated with all of the contact armatures of each denominational order, and a single automatic means for actuating said locking bars in denominational sequence as a number is indexed by the keys in denominational sequence.

53. In a machine of the class described, the combination of a plurality of keys, a corresponding number of relays individual to said keys, means for energizing any one of said relays upon depression of the corresponding key, a plurality of normally open denominational contact armatures associated with each relay and adapted to be closed upon energization of said relay, a locking bar associated with all of the contact armatures of each denominational order, means normally in position to actuate one of said bars, and automatic means for moving said actuating means into position to cooperate with the adjacent locking bar and simultaneously operating said one bar.

54. In a machine of the class described, the combination of a plurality of keys, a corresponding number of relays individual to said keys, means for energizing any one of said relays upon depression of the corresponding key, a plurality of normally open denominational contact armatures associated with each relay and adapted to be closed upon energization of said relay, a locking bar associated with all of the contact armatures of each denominational order, means normally in position to actuate one of said bars, and a ratchet mechanism operated upon the entry of a digit for moving said actuating means to actuate said bar and to move into position to actuate the adjacent bar upon entry of another digit.

55. In a machine of the class described, the combination of a plurality of keys, a corresponding number of relays individual to said keys, means for energizing any one of said relays upon depression of the corresponding key, a plurality of normally open denominational contact armatures associated with each relay and adapted to be closed upon energization of said relay, a locking bar associated with all of the contact armatures of each denominational order, means normally in position to actuate one of said bars, a ratchet mechanism operated upon the entry of a digit for moving said actuating means to actuate said bar to move into position to actuate the adjacent bar upon entry of another digit, and means for restoring said bar to hold said actuating means in the denominational position into which it has been moved.

56. In a machine of the class described, the combination of a plurality of keys, a corresponding number of relays individual to said keys, means for energizing any one of said relays upon depression of the corresponding key, a plurality of normally open denominational contact armatures associated with each relay and adapted to be closed upon energization of said relay, a locking bar associated with all of the contact armatures of each denominational order, means normally in position to actuate one of said bars, a ratchet mechanism operated upon the entry of a digit for moving said actuating means to actuate said bar and to move into position to actuate the adjacent bar upon entry of another digit, means for restoring said bar to hold said actuating means in the denominational position into which it has been moved, and means for restoring said actuating means to its denominational home position after all of the digits of a number have been entered.

57. In a machine of the class described, the combination of a plurality of keys, a corresponding number of relays individual to said keys, means for energizing any one of said relays upon depression of the corresponding key, a plurality of normally open denominational contact armatures associated with each relay and adapted to be closed upon energization of said relay, a locking bar associated with all of the contact armatures of each denominational order, means normally in position to actuate one of said bars, a ratchet mechanism operated upon the entry of a digit for moving said actuating means to actuate said bar and to move into position to actuate the adjacent bar upon entry of another digit, means for restoring said bar to hold said actuating means in the denominational position into which it has been moved, and means for disengaging said actuating means from said locking bars and ratchet mechanism to permit the return of said actuating means to its denominational home position.

58. In a machine of the class described, the combination of a series of keys, a series of relays corresponding to said keys and adapted to be energized individually by depression of the corresponding keys, a contact armature associated with each relay and adapted to be closed by energization of said relay, and automatic means for freeing all of said contact armatures and then locking the contact armature in the energized relay in closed position and all of the other contact armatures in open position.

59. In a machine of the class described, the combination of a series of keys, a series of relays corresponding to said keys and adapted to be energized individually by depression of the corresponding keys, a contact armature associated with each relay and adapted to be closed by energization of said relay, automatic means for freeing a contact armature locked in closed position and for locking the contact armature in the energized relay in closed position and for locking said latter contact armature and all of the other contact armatures in open position, and means for controlling said automatic means to release said contact armature locked in closed position upon depression of another of said keys for correction purposes.

60. In a machine of the class described, the combination of a series of keys, a corresponding series of relays individual to said keys and adapted to be energized by depression of the respective keys, a plurality of denominational order contact armatures associated with each relay, a locking means for all of the contact armatures of each denominational order adapted to lock the contact armatures in open and closed positions in deenergized and energized relays, means for actuating said locking means in denominational sequence as the digits of a number are entered, and manually controlled means for returning said actuating means into its denominational home position for purposes of correction or the entry of a new number.

61. In a machine of the class described, the combination with a plurality of keys, a plurality of relays individual to said keys and adapted to be energized upon depression of the respective keys, a plurality of denominational contact armatures associated with each relay and adapted to be closed by energization of such relay, a locking means for each series of contact armatures of the several denominational order of contact armatures, a magnet for actuating said locking means, a free contact armature in each of the plurality of relays for closing a circuit through said actuating magnet and adapted to be closed upon energization of the respective relay, and means for causing said actuating magnet to actuate said locking means in denominational sequence.

62. In a machine of the class described, the combination of a plurality of denominational series of digit contacts, a ten key keyboard, and means controlled by said keys as digits are entered in denominational sequence for closing and locking contacts corresponding to the digits entered and the denominational position of the digits, and for locking all other contacts in open position.

63. A register comprising a single series of digit relays, a plurality of pairs of denominational contacts controlled by each relay, means electrically connecting one member of each pair of contacts to the other corresponding denominational order contacts, and means electrically connecting the other members of said contacts of the same digit value.

64. A register comprising a single series of digit relays, a plurality of pairs of denominational contacts controlled by each relay, a continuous conductor electrically connected to corresponding contact members of all the pairs of contacts of each denomination, and conductors connected to all the other contact members of all of the pairs of denominational contacts of the same digit value.

65. A register comprising a single series of digit relays arranged side by side, a plurality of cooperating pairs of fixed and movable denominational contacts associated with each relay, all of the contacts in each denomination being arranged in a line extending along the length of the series and all of the contacts of each relay being arranged transversely of said series, a conductor for each denomination electrically connected to all the like contacts of the same denomination, and a conductor for each relay connected to all of the other contacts in said relay.

66. The combination of a register comprising a plurality of denominational series of pairs of digit contacts, a single series of digit transmission lines permanently connected to one member of all the contacts of the same digit value, and a series of denominational conductors electrically connected to the other members of the contacts of the same denominational order.

67. The combination of a register comprising a plurality of denominational series of pairs of contacts, a single series of digit transmission lines permanently connected to one member of all the contacts of the same digit value, a series of denominational conductors electrically connected to the other members of the contacts of the same denominational order, and means for activating said denominational conductors successively.

68. In a machine of the class described, the combination of a plurality of electrical registers, a plurality of series of denominational contacts in each register adapted to be closed to represent digits, and means controlled by one register to successively establish circuits through closed contacts in the other register in denominational sequence to set up the same digits in said first register in denominational sequence.

69. In a machine of the class described, the combination of a plurality of electrical registers, a plurality of series of denominational contacts in each register adapted to be closed to represent a digit, and means for closing circuits successively over the closed denominational contacts in one register to control a set up in the other register of the amount in the first register.

70. In a machine of the class described, the combination of a ten key keyboard, mechanism for receiving amounts indexed by the keys in the denominational order from highest to lowest denomination, a second mechanism for receiving amounts in denominational order, and means for transferring the amount digit by digit successively from the first receiving mechanism to the second receiving mechanism in the denominational order from lowest to highest order.

71. In a machine of the class described, the combination of a ten key keyboard, means for receiving digits from the keyboard in denominational order, a second means for receiving digits in denominational order, and means for transferring digits from the first to the second receiving means in an order reverse from that in which they were received in the first receiving means.

72. In a machine of the class described, the combination of a plurality of denominational series of digit contacts, a second plurality of denominational series of digit contacts, and means adapted to be set in operation to cause digit contacts of the second set corresponding to digit contacts of the first set to be closed automatically in succession in reverse denominational order.

73. In a machine of the class described, the combination of a plurality of denominational series of digit contacts adapted to be locked to represent a series of digits of a number, a second plurality of denominational series of digit contacts adapted to be locked to represent a series of digits of a number, means adapted to be normally associated with the digit contacts of lowest denominational order of the second plurality of contacts for locking the same in closed position, and denominational circuits adapted to be closed by said locking means to cause current to pass successively in denominational order from lowest to highest order, over the locked contacts of the first plurality of contacts to close corresponding digit contacts of the second plurality of contacts in denominational order from lowest to highest denomination.

74. The combination of a plurality of denominational series of digit contacts, means for closing and locking contacts according to the digits of a number from left to right and for unlocking previously locked contacts in the series in which contacts are being locked, a second plurality of denominational series of digit contacts, and means closing and locking the contacts of said second plurality of contacts in the order from lowest to highest denominational order whereby the last digit entered in the first plurality of contacts is always entered in the lowest and same series of digit contacts of the second series of digit contacts.

75. The combination of a plurality of denominational series of digit contacts, means for closing and locking contacts according to the digits of a number from left to right and for unlocking previously locked contacts in the series in which contacts are being locked, a second plurality of denominational series of digit contacts, in which each series represents a definite denominational order, means movable from series to series of the first plurality of contacts as amounts are received in the first plurality of contacts, means movable from series to series of the second plurality of contacts as amounts are entered therein, circuits selected by the position of the second movable means, contacts controlled by the first mentioned means for directing the first of said circuits through the contact of the first plurality of contacts representing the last digit entered, and means extending said circuit to control the closing and locking of a digit contact in the first denominational series of contacts of said second plurality of contacts.

76. The combination of a plurality of denominational series of digit contacts, means for closing and locking contacts in said series successively, a series of contacts successively made as digits are entered, a plurality of denominational relays equal in number to the denominational order of a number that may be entered and adapted to be selectively energized by circuits made through said successively made contacts, switches closed by said relays, a second plurality of denominational series of digit contacts adapted to be closed and locked in closed position, stationary contacts corresponding to the denominational orders of said second plurality of contacts, a movable contact cooperating successively with said stationary contacts as contacts are closed, and means for establishing circuits successively through said movable and stationary contacts, the closed contacts of said denominational relays and the closed contacts of said first plurality of denominational series of contacts for closing the second plurality of denominational series of digit contacts.

77. The combination of a plurality of denominational series of contacts adapted to be locked in closed position to represent digits of a number and to remain locked until another digit is set up in the same series, a second plurality of denominational series of contacts adapted to be closed and locked in closed position and to receive digits in denominational order, relays for closing the second plurality of contacts, means for establishing an energizing current for said relays through the digit contact representing the last digit entered in the first plurality of series of contacts and successively through the other locked contacts of said series, and means for locking closed contacts in said second plurality of contacts corresponding to the inverse denominational order of the contacts in the first plurality of series through which circuits are successively made.

78. The combination of a plurality of denominational series of contacts adapted to be locked in closed position, a series of denominational relays adapted to be energized selectively according to the number of digits entered on said contacts, a series of contacts closed by said relays, a second plurality of denominational series of contacts adapted to be locked in closed position, relays for closing said contacts, circuits selected according to the denominational series of contacts to be closed in the second plurality of series of contacts and continuing through the closed contacts controlled by the denominational relays across the closed contacts of the corresponding denomination of the first plurality of series of contacts to energize the relays closing said second plurality of series of contacts, and means for locking said second series of contacts corresponding to the denominational orders of the circuits in closed position.

79. The combination of an amount receiving mechanism comprising a plurality of denominational series of digit contacts, relays for closing the several denominational digit contacts of the same value, locking means for each series of digit contacts of the same denomination, means for automatically operating said locking means to lock a closed digit contact in one denomination and movable into position to lock a closed digit contact of the next denomination when said contact is closed, a registering mechanism similar in construction to that of the receiving mechanism, a plurality of denominational circuits closed successively by the movement of the lock operating means of said receiving and registering means, means for entering an amount in the receiving means, means for activating the lowest denominational circuit of the registering mechanism, a series of denominational relays selectively placed in circuit with the lowest significant denominational circuit of the receiving mechanism to be energized thereby, a plurality of contacts in each denominational relay, one member of certain of said contacts in each of said relays being in circuit with the circuits for the registering mechanism, and a second series of denominational circuits for the receiving mechanism connected to the digit contacts of said mechanism and the relays of the registering mechanism and to certain of the other contact members in said denominational relays, the circuits from the registering mechanism being controlled by the selected denominational contact to be connected to the closed contacts of the receiving device in ascending denominational order to first cause energization of a relay in the registering mechanism corresponding to the lowest order denominational digit entered in the receiving mechanism.

80. The combination of an amount receiving mechanism and a registering mechanism each comprising a series of digit relays and a series of denominational digit contacts in each relay adapted to be closed by energization of the relay, means in each mechanism traveling step by step denominationally to lock the closed contacts as amounts are entered, means for entering amounts in the receiving mechanism, circuits selected by the step by step mechanism of the register, a circuit selected by the step by step mechanism of the receiving mechanism after the amount has been received in the receiving mechanism, a switch individual to and closed by said last circuit for directing the successive circuits made by the step by step mechanism of the registering mechanism over the closed contacts of the receiving mechanism from lowest to highest denomination to energize the digit relays of the registering mechanism successively according to digits in the receiving mechanism, and means to actuate said step by step mechanism of the registering mechanism as such relays are energized in succession.

81. The combination of amount retaining mechanism comprising a plurality of denominational series of contacts, means for closing said contacts and for locking them in closed position according to the digits in the various denominational orders of a number, said contacts in any denominational order remaining locked until changed by the entry of another digit in said order, a second amount retaining mechanism of similar construction, means for closing and locking the contacts of the second mechanism in accordance with the contacts closed and locked by introduction of a number in the first mechanism, and means for controlling said transferring means to transfer the number last introduced and to prevent transfer of any digit previously introduced and not erased by the introduction of the last number.

82. The combination of two amount receiving mechanisms of similar construction, means for introducing a number into one of said mechanisms by entering the digits successively from highest to lowest denominational order, and means for transferring the digits from the first to the second mechanism successively from lowest to highest denominational order and for preventing transfer of the digits of any number previously entered in said first mechanism.

83. The combination of two amount receiving mechanisms each comprising a plurality of denominational series of contacts adapted to be closed and locked to represent digits of a number denominationally, and circuits controlled by the mechanism for transferring the last digit entered in one of the mechanisms into the lowest denominational digit contact in the other mechanism and the other digits in succession and for omitting transfer of digits of previously entered numbers.

84. The combination of a plurality of registers each comprising a plurality of denominational series of contacts and means for causing amounts entered therein to be entered successively denominationally, of a reversing mechanism for controlling entry of amounts in the second register under control of the first register in reverse order, and a circuit established through said reversing mechanism after completion of the transmission operation for restoring said first mentioned means of both registers to home position.

85. The combination of a plurality of registers each comprising denominational series of contacts, mechanism in each register for entering digits of amounts therein successively in denominational sequence, a plurality of reversing relays selectively energized under control of said mechanism in one of the registers to close circuits between the registers equal in number to the number of digits in said one register, means controlled by said mechanism of the other register to successively activate said circuits, and another circuit closed in said relays and activated by said mechanism of said other register after all of said first circuits have been activated for restoring both of said mechanisms to home position.

86. The combination of a plurality of amount receiving mechanisms each comprising contacts adapted to be locked in closed position to represent denominational digits of a number, means for entering amounts into one of said mechanisms, and means for transferring an amount from said one mechanism to the other mechanism and adding it to the amount in said other register, said means comprising circuits through locked contacts representing the same denominational order in said mechanisms, a computing mechanism controlled by said circuits, and result circuits from said computing mechanism to said second mechanism to control the closing and locking of contacts representing the result.

87. The combination of a plurality of amount receiving mechanisms each comprising contacts adapted to be locked in closed position to represent denominational digits of a number, means for entering amounts into one of said mechanisms, and means for transferring amounts from said one mechanism and adding them to amounts in the other mechanism, said means comprising circuits through locked contacts in the same denominational order in said mechanisms, a computing mechanism controlled by said circuits, result circuits from said computing mechanism to said second mechanism to control the closing and locking of contacts representing the result, and transfer mechanism controlled by circuit closed by said computing mechanism and said other receiving mechanism to add the unit of transfer to the computation of the digits in the next higher denominational order.

88. The combination of a plurality of amount receiving mechanism each comprising contacts adapted to be locked in closed position to represent denominational digits of a number, means for entering amounts into one of said mechanisms, and means for transferring an amount from said one mechanism to the other mechanism and adding it to the amount in the latter, said means comprising circuits through locked contacts in the same denominational order in said mechanisms, a computing mechanism controlled by said circuits, result circuits from said computing mechanism to said second mechanism to control the closing and locking of contacts representing the result, and transfer switch mechanism controlled by said computing mechanism to increase the value of the circuit from the contact of the next denominational order of the first amount receiving mechanism by one prior to the computation of the digits of the next denominational order.

89. In a registering mechanism comprising a series of digit relays, a plurality of denominational series of digit contacts adapted to be closed by energization of said relays, locking means for each series of contacts, means movable from series to series successively for actuating said locking means, a magnet for operating said movable means, an energizing circuit for said operating magnet adapted to be established by energization of any one of said digit relays, a self-closing circuit for each of said digit relays closed at one point by contacts closed by said relays, and means operated as said movable means is operated for closing said self-closing circuit at another point and maintaining it closed until the locking means has performed its function.

90. In a machine of the class described, the combination of two registers, means for transmitting the number in one register into the other register to set up said number in said other register, and means operable during the transmission of the number to the second register to clear the second register of all digits of former numbers of equal or lower denominational orders.

91. In a machine of the class described, the combination of two registers, a computing mechanism, and means for transmitting to the computing mechanism numbers corresponding to those in the registers and the result to one of said registers and automatically conditioning said registers to receive other numbers.

92. The combination of two registers, a computing mechanism, means for entering numbers in the computing mechanism corresponding to the numbers in the registers under control of the registers, means for transmitting the computed result to one register and clearing it of the number entering the computation incidentally to the entry of the computed result, and means for conditioning the other register to receive a new number without clearing it of the number entering the computation.

93. In a machine of the class described, the combination of a register, means for entering digits denominationally in said register comprising means traveling step by step from lowest to highest denominational order, and means for automatically returning said traveling means to its home position upon entry of the highest denominational digit of a number.

94. The combination of two registers, means for entering numbers therein, means under control of said registers including a computing mechanism for denominationally adding the digits of said numbers and entering the sum denominationally in one of said registers, means for discontinuing denominational entry of the result in the second register after all of the digits on the other register have entered into the computation, and means for preventing operation of said discontinuing means when the sum of the last digit on the first register enters into a result greater than nine, said preventing means being effective also so long as the sum of the unit transfer and the corresponding denominational digit in the second register is greater than nine.

95. The combination of two registers adapted to receive numbers, means for adding the numbers together successively by digits denominationally, and means for discontinuing the addition after the highest digit in one of the registers has been added and the sum of the same with the corresponding digit of the other register does not involve a transfer.

96. In a machine of the class described, the combination of a mechanism adapted to receive a set-up of numbers successively, means for clearing the mechanism of the digits of the same denominational order as digits of a number are entered, transmitting mechanism adapted to be controlled by the last-set up in said mechanism, and means for preventing a previous set-up from controlling said transmitting mechanism.

97. The combination of a plurality of relays each provided with a plurality of circuit closing armatures for closing circuits each representing a digit and its denominational position, and means for automatically mechanically locking any denominational digit armature closed by energization of its respective relay, in closed position.

98. The combination of a plurality of relays each provided with a plurality of circuit closing armatures for closing circuits each representing a digit and its denominational position, means for automatically mechanically locking any denominational digit armature closed by energization of its respective relay, in closed position, and the remaining digit armatures of the same denomination in open position.

99. In an electrical calculating machine the combination of a plurality of sets of electrical lines each set of which represents the series of digits of a numerical system and each of said sets being common to a plurality of denominational orders, means for interconnecting lines of said sets in mathematical combinations, and means for closing successive circuits over certain of said lines when connected, said successive circuits representing respectively different denominational orders.

100. In an electrical calculating machine the combination of two sets of electrical lines each set of which represents the series of digits of a numerical system and each of said sets being common to a plurality of denominational orders, means for interconnecting lines of said sets in mathematical combinations, said means comprising a plurality of multicontact switching units, and means for closing successive circuits over certain of said lines when connected, said successive circuits representing sequential denominational orders, and each line of each set simultaneously placing under current contacts in a plurality of said switching units.

101. In an electrical calculating machine the combination of a register device comprising electrically operated elements representing respective digit values of a numerical series, means adapted to make automatic successive step by step movements corresponding to respective denominational orders, and means for operating said elements individually to thereby enter respective digit values of given denominational orders in said device upon each step by step movement.

102. In an electrical calculating machine of the character described the combination of key operating means, a register device comprising electrical elements representing digit values, means adapted to make successive step by step movements corresponding to respective denominational orders, and means for entering respective digit values of given denominational orders in said device upon each step by step movement to thereby enter into said register device a number of given numerical value, said device being adapted to retain said number for subsequent use in the cycle of operation of said machine.

103. In an electrical calculating machine the combination of a register device comprising electrical elements representing digit values common to a plurality of denominational orders, means adapted to make successive step by step movements in said device corresponding to respective denominational orders, and means for entering digit values corresponding to successive denominational orders in said device upon respectively successive step by step movements.

104. In an electrical calculating machine, the combination with sets of digit lines and means for interconnecting said lines according to mathematical functions, a register device interconnected with said interconnecting means and adapted to receive mathematical results entered therein by certain of said lines, and a digit keyboard for entering into said machine respective numbers whose mathematical result is desired, of a recording device separate from said machine and electrically connected to said register device to receive electrical impulses therefrom representative of said mathematical result.

105. In an electrical calculating machine, the combination of a first set of 10 digit lines, a second set of 10 digit lines, 10 groups of electrical contacts for interconnecting said lines, 10 electrically operated units for closing respective groups of contacts, and means for connecting certain of said lines when closed over corresponding contacts to a source of potential.

106. In an electrical calculating machine, the combination of a first set of 10 digit lines, a second set of 10 digit lines, 10 groups of electrical contacts for interconnecting said lines, 10 electrically operated units for closing respective groups of contacts, and register means, one set of said lines being electrically connected to said register means from said groups of contacts and the other of said set of lines being electrically connected from said register means to said groups of electrical contacts.

107. In an electrical calculating machine, the combination of a first set of 10 digit lines, a second set of 10 digit lines, 10 groups of electrical contacts for interconnecting said lines, 10 electrically operated units for closing respective groups of contacts, said two sets of lines and said contacts being common to a plurality of denominational orders, and means for connecting certain of said lines closed over corresponding contacts to a source of potential.

108. In an electrical calculating machine, the combination of a first set of 10 digit lines, a second set of 10 digit lines, 10 groups of electrical contacts for interconnecting said lines, each line of said two sets of lines being connected to respectively corresponding contacts of each group, 10 electrically operated units for closing respective groups of contacts, and register means, one set of said lines being electrically connected to said register means from said groups of contacts and the other of said set of lines being electrically connected from said register means to said groups of electrical contacts.

109. In an electrical calculating machine, the combination of two sets of lines each set of which represents the series of digits of a numerical system, means for interconnecting lines of said sets for effecting mathematical calculations, and means actuated by electrical impulses passing over said interconnected lines for automatically indicating or recording the results.

110. In an electrical calculating machine, the combination of two sets of electrical lines each set of which represents the series of digits in a numerical system, means under cyclical electrical control for interconnecting lines of said sets for effecting mathematical calculations, and means actuated by electrical impulses passing over said interconnected lines for indicating or recording the results.

111. In an electrical calculating machine the combination of, two sets of electrical lines, means for interconnecting lines of said sets for effecting mathematical combinations, electrical means for causing said interconnection, and control means comprising a series of digit selecting elements, said series corresponding to a single continuous sequence of the digit system utilized and being common to a plurality of denominational orders.

112. In an electrical calculating machine the combination of, two sets of electrical lines each set of which represents the series of digits of a numerical system, means for interconnecting lines of said sets for effecting addition, electrical means for causing said interconnection, and control means comprising a series of digit selecting elements, said series corresponding to a continuous sequence of the digit system utilized and being common to all denominational orders within the capacity of the machine.

113. In an electrical calculating machine the combination of, two sets of electrical lines each set of which represents the series of digits of a numerical system, means for interconnecting lines of said sets for effecting mathematical calculations, and a register device comprising electrical elements operated by current impulses in lines of one set to alter the physical condition of said device, said device being adapted to retain said physical altered condition after said impulses have ceased, and said physical alteration being adapted to control electrical impulses over said other set of lines.

114. In an electrical calculating machine the combination of, two sets of electrical lines each set of which represents the series of digits of a numerical system, means for interconnecting lines of said sets for effecting mathematical calculations, a register device comprising electrical elements operated by current impulses in lines of one set which operate said elements to physically alter the condition of said device, and means for transmitting current impulses through said register device according to the altered condition of said device at any desired time after said impulses causing said altered condition have ceased.

115. In an electrical calculating machine the combination of, two sets of electrical lines each set of which represents the series of digits of a numerial system, means for interconnecting lines of said sets for effecting mathematical calculations, a register device comprising electrical elements operated by current impulses in lines of one set which operate said elements to physically alter the condition of said device, means for transmitting current impulses through said register device according to the altered condition of said device at any desired time after said impulses causing said altered physical condition have ceased, and means operable by said transmitted current impulses for recording digit values represented by said last mentioned impulses.

116. In an electric calculating machine the combination of, two sets of electrical lines each set of which represents the digits of a numerical system, an electric calculating unit comprising means for interconnecting the lines of said two sets in mathematical combinations, and a register comprising a plurality of elements electrically operated individually by current impulses in lines of one of said sets to change the physical condition of said register, said register being adapted to maintain its changed physical condition after said current impulses have ceased to operate said elements and being adapted to control current impulses over said other set of lines.

117. In an electric calculating machine the combination of, two sets of electrical lines each set of which represents the digits of a numerical system, a plurality of relays operating contact means for interconnecting the lines of said two sets in mathematical combinations, and a register comprising a plurality of elements electrically operated individually by current impulses in lines of one of said sets to change the physical condition of said register, said register being adapted to maintain its changed physical condition after said current impulses have ceased to operate said elements and being adapted to control current impulses over said other set of lines.

118. In an electric calculating machine the combination of, two sets of electrical lines each set of which represents the digits of a numerical system, a plurality of relays operating contact means for interconnecting the lines of said two sets in mathematical combinations, said relays being operated by current impulses in respectively corresponding energizing lines serving to close current circuits through the lines of one of said sets of digit lines with predetermined lines of the other set of digit lines, and a register comprising a plurality of elements electrically operated individually by current impulses passing over said connected lines of said sets of electrical lines to change the physical condition of said register, said register being adapted to maintain its changed physical condition after said current impulses have ceased to operate said elements.

119. In an electric calculating machine the combination of, two sets of electrical lines each set of which represents the digits of a numerical system, an electric calculating unit comprising means for interconnecting the lines of said two sets in mathematical combinations, and a register comprising a plurality of elements electrically operated individually by current impulses in lines of one of said sets to change the physical condition of said register, said register being adapted to maintain its changed physical condition after said current impulses have ceased to operate said elements and furnishing a path therethrough for establishing sequential current impulse flow to said second set of lines subsequent to and predetermined by said physical condition alteration.

120. In a device of the character described, two sets of digit lines each equal in number to the digits of a numerical system, a register device comprising a plurality of electrically operated members actuated by current in respectively corresponding lines of one set for determining the closing of contacts for closing lines of the second set, and means for interconnecting said sets in accordance with mathematical functions for connecting said closed lines of said second set with the desired lines of said first set, said interconnecting means comprising a plurality of electrical relays equal in number to the number of lines in the first of said sets and each of said relays operating a plurality of contacts equal in number to the lines of the second of said sets.

121. In a device of the character described, two sets of digit lines, means for interconnecting said lines in mathematical combinations, a register device, and electrical circuits adapted to be closed in a predetermined order by said register device for rendering said interconnecting means effective.

122. In an electrical calculating machine for combining two numbers mathematically, a set of digit keys corresponding to a single series of digits of the numerical system and common to both numbers and common to a plurality of denominational orders, means controlled by said keys for entering the first number into the system, means also controlled by said keys for entering the second number into the system, and means for mathematically combining said numbers to produce the answer.

123. In an electrical calculating machine the combination of, two sets of electrical lines common to a plurality of denominational orders, means for interconnecting lines of said sets for effecting mathematical calculations, electrical means for causing said interconnection, control means comprising a series of digit selecting elements, and means for effecting a carry-over transfer from one denominational order to another denominational order.

124. In an electric calculating machine two sets of each ten digit lines corresponding to the units of the numerical system, ten key operated multiple contact relays for interconnecting said two sets of digit lines in ten combinations, a set of transfer lines, contacts on said multiple contact relays for connecting one of said transfer lines in parallel with any interconnected pair of digit lines representing digits the sum of which is a two-figured number, switching means comprising two alternate paths through which one set of said digit lines passes, one of said paths increasing the numerical value of a digit line by one and being operatively controlled by one of said transfer lines, a registering device comprising ten multiple contact relays, each of which is adapted to be energized by current in one of the sets of digit lines, electrically operated means for locking the contacts closed and then releasing the same when a current is caused to pass through a digit line of the same set corresponding to a number of the same denominational value and a recording device actuated by current impulses passing through the contacts of the registering device for recording the result of the calculating operation.

125. The combination of two registers, means for entering numbers in one and electrically transmitting such numbers to the other, circuits for controlling the printing of such numbers as they are transmitted, and circuits for controlling the printing of the numbers after they have been transmitted, and printing magnets common to said circuits.

126. The combination of a register comprising digit relays, a computing mechanism for adding a number to the number in said register, transfer switch mechanism, transfer switch controlling lines activated in said computing mechanism, and contacts in said relays in said transfer lines for permitting said transfer switch mechanism to be energized after energization of a digit relay corresponding to the units digit of the sum.

127. In an electrical adding machine comprising mechanisms for receiving numbers to be added, each mechanism comprising a single series of digit relays each provided with a denominational series of contacts and means for locking the contacts in closed position; an adding mechanism comprising a single series of relays and a transfer relay, and means adapted when set in operation, to establish circuits over the contacts of said receiving mechanisms denominationally from lower to higher order to successively control said adding mechanism to add the digits of the numbers denominationally in ascending order and register the result in one of said receiving mechanisms, said transfer relay being operated when necessary to add the units of transfer as the next higher order digits are added.

In testimony whereof I have signed my name to this specification.

ROLF HOFGAARD.